(12) United States Patent
Iwakura

(10) Patent No.: US 10,936,948 B2
(45) Date of Patent: Mar. 2, 2021

(54) EFFICIENT UPDATING OF A MODEL USED FOR DATA LEARNING

(71) Applicant: FUJITSU LIMITED, Kawasaki (JP)

(72) Inventor: Tomoya Iwakura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 828 days.

(21) Appl. No.: 15/700,447

(22) Filed: Sep. 11, 2017

(65) Prior Publication Data

US 2018/0075351 A1   Mar. 15, 2018

(30) Foreign Application Priority Data

Sep. 15, 2016   (JP) .............................. JP2016-180864

(51) Int. Cl.

| | | |
|---|---|---|
| G06N 3/08 | (2006.01) | |
| G06K 9/62 | (2006.01) | |
| G06N 5/02 | (2006.01) | |
| G06N 20/00 | (2019.01) | |
| G06K 9/34 | (2006.01) | |
| G06K 9/00 | (2006.01) | |
| G06K 9/32 | (2006.01) | |
| G06N 20/10 | (2019.01) | |

(52) U.S. Cl.
CPC .......... *G06N 3/08* (2013.01); *G06K 9/00852* (2013.01); *G06K 9/325* (2013.01); *G06K 9/34* (2013.01); *G06K 9/6232* (2013.01); *G06K 9/6256* (2013.01); *G06K 9/6268* (2013.01); *G06N 5/025* (2013.01); *G06N 20/00* (2019.01); *G06N 20/10* (2019.01)

(58) Field of Classification Search
None
See application file for complete search history.

(56) References Cited

U.S. PATENT DOCUMENTS

2017/0230400 A1*   8/2017   Ahmed .................. G06N 3/086

OTHER PUBLICATIONS

Kudo et al., "Fast Methods for Kernel-based Text Analysis" 2003, ACL, all pages (Year: 2003).*

(Continued)

*Primary Examiner* — Daniel C Puentes
(74) *Attorney, Agent, or Firm* — Staas & Halsey LLP

(57) ABSTRACT

An apparatus acquires learning-data, including feature-elements, to which a label is assigned. The apparatus generates a first-set of expanded feature-elements by expanding the feature-elements. With reference to a model where a confidence value is stored in association with each of a second-set of expanded feature-elements, the apparatus updates confidence values associated with expanded feature-elements common between the first- and second-sets of expanded feature-elements, based on the label. Upon occurrence of an error indicating that a score calculated from the updated confidence values is inconsistent with the label, the apparatus sets a feature-size indicating a maximum size of expanded feature-elements to be used to update the model, based on the number of occurrences of the error for the acquired learning-data, and updates the model by adding, out of expanded feature-elements generated according to the set feature-size, expanded feature-elements unmatched with the second-set of expanded feature-elements, to the model.

6 Claims, 23 Drawing Sheets

(56) References Cited

OTHER PUBLICATIONS

Crammer et al., "Online Passive-Aggressive Algorithms", Journal of Machine Learning Research 7, 2006, pp. 551-585.
Suzuki et al., "Convolution Kernels with Feature Selection for Natural Language Processing Tasks", In Proceedings of the 42nd Annual Meeting of the Association for Computational Linguistics, Jul. 21-26, 2004,Barcelona, Spain, pp. 119-126, 2004.
Yan et al., "gSpan: Graph-Based Substructure Pattern Mining", IEEE, 2002, pp. 721-724.
Yoshinaga et al., "Kernel Slicing: Scalable Online Training with Conjunctive Features", In Proceedings of the 23rd International Conference on Computational Linguistics (COLING 2010), Aug. 23-27, 2010, Beijing, China, pp. 1245-1253.
Zaki, "Efficiently Mining Frequent Trees in a Forest", In Proceedings of SIGKDD'02, 2002, pp. 71-80.

* cited by examiner

INITIALIZE WEIGHT VECTOR $w_0 = 0$

For $t = 1, ..., T$

- RECEIVE ONE LEARNING EXAMPLE $x_t$

- CALCULATE SCORE USING CURRENT WEIGHT VECTOR $m_t = w_{t-1} \cdot \phi(x_t)$

- RECEIVE RIGHT LABEL $y_t$

- IF $m_t y_t < 0$, UPDATE WEIGHT VECTOR $w_t = w_{t-1} + y_t \phi(x_t)$

- IF NOT UPDATED $w_t = w_{t-1}$

| LABEL | TEXT |
|---|---|
| NORMAL | PROPOSE SIMPLE SPEED IMPROVEMENT METHOD |
| NORMAL | SALES AMOUNT OF ONE MILLION YEN OR MORE |
| SPAM | SIMPLE IMPROVEMENT IN SALES AMOUNT BY ONE MILLION YEN |

| LABEL | FEATURE |
|---|---|
| NORMAL | SIMPLE, SPEED, IMPROVEMENT |
| NORMAL | SALES AMOUNT, ONE MILLION YEN, MORE |
| SPAM | SIMPLE, SALES AMOUNT, ONE MILLION YEN, IMPROVEMENT |

FIG. 4

| LABEL | FEATURE |
|---|---|
| NORMAL | SIMPLE, SPEED, IMPROVEMENT, SIMPLE & SPEED, SIMPLE & IMPROVEMENT, SPEED & IMPROVEMENT |
| NORMAL | SALES AMOUNT, ONE MILLION YEN, MORE SALES AMOUNT & ONE MILLION YEN, SALES AMOUNT& MORE, ONE MILLION YEN & MORE |
| SPAM | SIMPLE, SALES AMOUNT, ONE MILLION YEN, IMPROVEMENT, SIMPLE & SALES AMOUNT, SIMPLE & & ONE MILLION YEN, SIMPLE & IMPROVEMENT, SALES AMOUNT & ONE MILLION YEN, SALES AMOUNT & IMPROVEMENT, ONE MILLION YEN & IMPROVEMENT |

FIG. 10

```
INITIALIZE WEIGHT VECTOR w₀ = 0
L: MAXIMUM SIZE FOR FEATURES TO BE EXTRACTED
E[x]: ERROR COUNT FOR x. INITIAL VALUE = 0
For t = 1, ..., T
 - RECEIVE ONE LEARNING EXAMPLE xₜ
 - CALCULATE SCORE USING CURRENT WEIGHT VECTOR
   mₜ = wₜ₋₁ · φ(xₜ, L)
 - RECEIVE RIGHT LABEL yₜ
 - IF mₜyₜ < 0, UPDATE WEIGHT VECTOR
   E[xₜ]++ # INCREMENT ERROR COUNT E[xₜ] BY ONE
   # SET EXTRACTION SIZE FOR UPDATE AT SMALLER ONE OF
     ERROR COUNT E[xₜ] AND MAXIMUM FEATURE SIZE L
   l = min(E[x];L)
   wₜ = wₜ₋₁ + yₜφ(xₜ, l)
 - IF NOT UPDATED
   wₜ = wₜ₋₁
```

FIG. 20

Input parameters r
Initialize $\mu_0 = 0$, $\Sigma_0 = I$
For t = 1, ..., T
- Receive a training example $x_t$
- Compute margin $m_t$ and confidence $v_t$
  $m_t = \mu_{t-1} \cdot \phi(x_t)$
  $v_t = \phi(x_t)^T \Sigma_{t-1} \phi(x_t)$
- Receive true label $y_t$
- If $m_t y_t < 1$, update parameters:
  $\alpha_t = \max(0, 1 - y_t \phi(x_t)^T \cdot \mu_{t-1})$ $\qquad \beta_t = \dfrac{1}{v_t + r}$
  $\mu_t = \mu_{t-1} + \alpha_t \Sigma_{t-1} y_t \phi(x_t)$ $\qquad \Sigma_t = \Sigma_{t-1} - \beta_t \Sigma_{t-1} \phi(x_t) \phi(x_t)^T \Sigma_{t-1}$

FIG. 22

Input parameters r
Initialize $\mu_0 = 0$, $\Sigma_0 = I$
L: MAXIMUM SIZE FOR FEATURES TO BE EXTRACTED
E[x]: ERROR COUNT FOR X. INITIAL VALUE = 0
For t = 1, ..., T
- Receive a training example $x_t$
- Compute margin $m_t$ and confidence $v_t$
  $m_t = \mu_{t-1} \cdot \phi(x_t, L)$
  $v_t = \phi(x_t, L)^T \Sigma_{t-1} \phi(x_t, L)$
- Receive true label $y_t$
- If $m_t y_t < 1$, update parameters:
  E[$x_t$]++ #INCREMENT ERROR COUNT E[$x_t$] BY ONE
  # SET EXTRACTION SIZE FOR UPDATE AT SMALLER ONE OF ERROR
    COUNT E[$x_t$] AND MAXIMUM FEATURE SIZE L
  l = min(E[x], L)
  $\alpha_t = \max(0, 1 - y_t \phi(x_t, l)^T \cdot \mu_{t-1})$     $\beta_t = \frac{1}{v_t + r}$
  $\mu_t = \mu_{t-1} + \alpha_t \Sigma_{t-1} y_t \phi(x_t, l)$     $\Sigma_t = \Sigma_{t-1} - \beta_t \Sigma_{t-1} \phi(x_t, l) \phi(x_t, l)^T \Sigma_{t-1}$

EFFICIENT UPDATING OF A MODEL USED FOR DATA LEARNING

CROSS-REFERENCE TO RELATED APPLICATION

This application is based upon and claims the benefit of priority of the prior Japanese Patent Application No. 2016-180864, filed on Sep. 15, 2016, the entire contents of which are incorporated herein by reference.

FIELD

The embodiments discussed herein are related to efficient updating of a model used for data learning.

BACKGROUND

Natural language processing adopts various machine learning techniques such as perceptron, support vector machines (SVMs), passive-aggressive (PA), and adaptive regularization of weight vectors (AROW).

In an example of machine learning using text data, a vector is generated by: extracting words from the text data; associating the extracted words with dimensions of the vector; and assigning the term frequencies of the words in the text to the associated dimension values of the vector. In this example, the word is termed a feature, and the vector is termed a feature vector.

In the natural language processing, feature combinations are likely to affect the accuracy. In the natural language processing, the number of features is in the order of tens of thousands, and becomes more enormous if the number of feature combinations is considered additionally. In addition, in the natural language processing, a character string may be expressed in an array. Furthermore, a parsed text is expressed in a tree. Thus, in addition to the learning method using vector data, there are learning methods using structured data such as string (array), tree, and graph data.

Kernel methods are of a type of learning methods for learning feature combinations and using strings, trees, and graphs. The kernel methods perform the learning after computing inter-data similarity.

The kernel methods compute the inner products between all pairs of learning instances while implicitly extracting features. Accordingly, the kernel methods are capable of efficient computation in learning the feature combinations, and in using the semi-structured data such as string, tree and graph data.

These techniques are disclosed in, for example: Koby Crammer, Ofer Dekel, Joseph Keshet, Shai Shalev-Shwartz, and Yoram Singer. "Online Passive-Aggressive Algorithms", Journal of Machine Learning Research, 7:551-585, 2006; Jun Suzuki, Hideki Isozaki, and Eisaku Maeda. "Convolution Kernels with Feature Selection for Natural Language Processing Task", In Proceedings of the 42nd Annual Meeting of the Association for Computational Linguistics, 21-26 Jul. 2004, Barcelona, Spain, pp. 119-126, 2004; X. Yan and J. Han. gspan: Graph-based Substructure Pattern Mining, 2002; Naoki Yoshinaga and Masaru Kitsuregawa. "Kernel Slicing: Scalable Online Training with Conjunctive Features", In Proceedings of the 23rd International Conference on Computational Linguistics (COLING 2010), 23-27 Aug. 2010, Beijing, China, pp. 1245-1253, 2010; and Mohammed Zaki. "Efficiently Mining Frequent Trees in a Forest", In Proceedings of SIGKDD'02, pp. 71-80, 2002.

SUMMARY

According to an aspect of the invention, an apparatus acquires learning data to which a label of positive type or negative type is assigned, where the learning data includes feature-elements each configured as a feature or sub-structural data. The apparatus generates a first set of expanded feature-elements by expanding the feature-elements included in the acquired learning data so that each expanded feature-element is configured as data generated from a combination of one or more feature-elements. With reference to a model in which a confidence value indicating a degree of confidence for a feature-element is stored in association with each of a second set of expanded feature-elements, the apparatus compares each of the first set of expanded feature-elements with the second set of expanded feature-elements stored in the model, and updates first confidence values associated with expanded feature-elements that are common between the first set of expanded feature-elements and the second set of expanded feature-elements stored in the model, based on a type of the label assigned to the learning data. Upon occurrence of a classification error indicating that a type of a score calculated from the updated first confidence values is inconsistent with a type of the label assigned to the acquired learning data, the apparatus sets a feature size indicating a maximum size of expanded feature-elements to be used to update the model, based on an error count indicating a number of occurrences of the classification error for the acquired learning data, and updates the model by adding, out of expanded feature-elements generated according to the set feature size, expanded feature-elements unmatched with the second set of expanded feature-elements stored in the model, to the model The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of how features are expanded, according to an embodiment;

FIG. 10 is a diagram illustrating an example of a pseudo algorithm for an error-based perceptron, according to an embodiment;

FIG. 20 is a diagram illustrating an example of a pseudo algorithm for AROW based on dynamic feature expansion, according to an embodiment;

FIG. 22 is a diagram illustrating an example of a pseudo algorithm for error-based AROW, according to an embodiment.

DESCRIPTION OF EMBODIMENTS

The foregoing technique, however, involves risks of a decrease in the processing speed and an increase in the amount of memory usage.

A kernel method uses the inner products between all pairs of learning instances. If the number of learning data increases, the processing speed is lowered. Meanwhile, confidence-weighted learning, typified by AROW, desires additional learning of the confidence of each feature, and therefore, unlike perceptron and PA, is unable to employ the method of implicitly extracting features by using the kernel function computing the inner products between all pairs of learning instances.

Against this background, there is an idea of explicitly extracting feature combinations in advance. However, the explicit extraction increases the number of combinations and accordingly the amount of memory usage. For example, in one possible solution, confidence-weighted learning with learning the confidences of features may employ a technique of explicitly extracting all the features in advance instead of a kernel method based on the inner product computation. However, the explicit extraction of all the features in advance causes a vast number of features extracted as discussed below, and increases the amount of memory usage. For example, if combinations of d features among n features are considered at most, the number of features to be extracted in advance is expressed by Formula (1) given below. In addition, if all sets of k characters in succession are selected from a string containing n characters, the number of partial character strings to be listed is expressed by Formula (2).

Formulas (1) and (2) are expressed with $$\sum_{i=1}^{min(n,d)} {}_nC_i \text{ and} \qquad (1)$$

$$\sum_{i=1}^{min(n,k)} n-i+1 \qquad (2)$$

respectively.

An aspect of the embodiments discussed herein aims at providing a learning program, a learning method and a learning machine which are capable of reducing an amount of memory usage.

Hereinafter, referring to the accompanying drawings, descriptions will be provided for a learning program, a learning method and a learning machine related to this disclosure. Note that: the following embodiments do not limit the disclosed techniques, and be combined together depending on the necessity as long as processes performed in a combination of embodiments do not cause inconsistency.

Embodiment 1

Figures 1, 2:
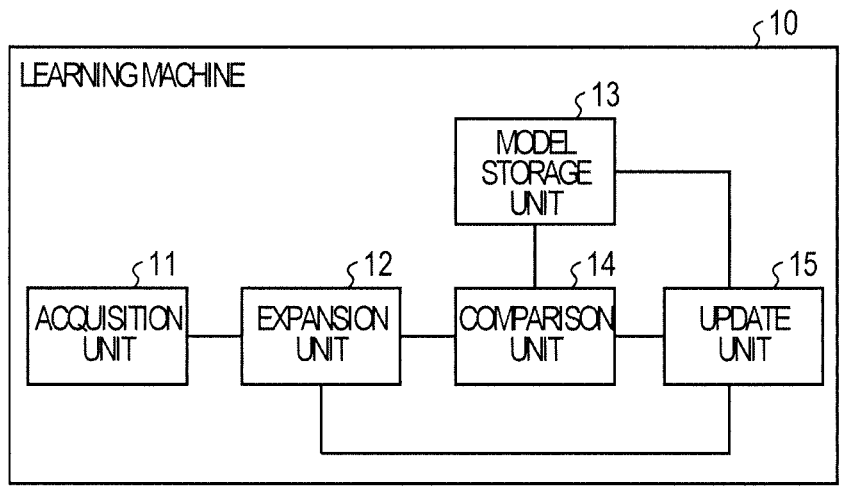
FIG. 1 is a diagram illustrating an example of a functional configuration of a learning machine, according to an embodiment.
FIG. 2 is a diagram illustrating an example of a pseudo algorithm for a perceptron based on dynamic feature extraction, according to an embodiment.

FIG. 1 is a block diagram illustrating a functional configuration of a learning machine in Embodiment 1. The learning machine 10 illustrated in FIG. 1 is configured to perform feature learning processing in natural language processing. An aspect of the learning machine 10 is to inhibit an increase in an amount of memory to be used for feature combinations, by employing the perceptron to learn the confidences of features without using the kernel method.

In other words, the learning machine 10 employs a method of performing the learning while dynamically performing feature expansion processing for expanding features without expanding features in advance. FIG. 2 is a diagram illustrating an example of a pseudo algorithm for the perceptron based on the dynamic feature expansion. "x" illustrated in FIG. 2 represents a character string; and φ(x) represents a function for mapping a feature combination extracted from the character string x, or a partial character string extracted from the character string x, for example a partial character string common between two structural data, to a vector. Furthermore, "w" illustrated in FIG. 2 represents a weight vector. For example, in a d-dimensional vector space, "$w_t$" represents a d-dimensional weight vector in a t-th round. Incidentally, although "w" is not italicized in this disclosure for the sake of word processing convenience, the italicized form is actually used in the actual mathematical notation for "w" indicating the weight vector.

As illustrated in FIG. 2, the learning machine 10 learns weight vectors from learning data while dynamically expanding features from viewpoints that: (1) only features included in a model are used for the classification; and (2) only features generated from a misclassified example are used for the updating. In other word, the learning machine 10 classifies each learning data by: performing the feature expansion processing to obtain only features included in the model; and calculating the total score value of the learning data by using the scores registered in the model. When the learning data is classified into a wrong class, the learning machine 10 updates the model, by performing the feature expansion processing to obtain only features generated from the misclassified example. This makes it possible for the learning machine 10 to perform the learning while performing feature expansion processing to obtain only feature combinations and partial structures to be used for the classification, instead of all the feature combinations and all the partial structures. This accordingly makes it possible to make an amount of memory usage smaller than in the case where the feature combinations and all the partial features are obtained by the feature expansion processing in advance.

The learning machine 10 illustrated in FIG. 1 is a computer for achieving the foregoing learning processing.

In the Embodiment 1, the learning machine 10 may be implemented by installing a learning program for performing the foregoing learning processing in the form of package software or online software into a desired computer. For example, when the learning program is executed by an information processor, the information process may be made to function as the learning machine 10. Examples of the information processor include: a desktop personal computer, a note-type personal computer, a mobile communication terminal such as a smartphone, a cellular phone, and a personal handyphone system (PHS), and a slate terminal such as a personal digital assistant (PDA). Furthermore, the learning machine 10 also may be implemented as a server device which provides services for the foregoing learning processing to a client device which is a terminal device of a user. For example, the learning machine 10 is implemented as a server device which provides learning services such that upon receipt of learning data each labeled as a positive or negative type, or upon receipt of identification information allowing the server device to retrieve learning data via a network or a storage media, the server device outputs a result of performing the learning processing on the learning data, that is to say, a model to be used by a classifier. In this case, the learning machine 10 is implemented as a Web server, or as a cloud server which provides service for the learning processing in the form of outsourcing.

As illustrated in FIG. 1, the learning machine 10 includes an acquisition unit 11, an expansion unit 12, a model storage unit 13, a comparison unit 14, and an update unit 15. Incidentally, in addition to the functional units illustrated in FIG. 1, the learning machine 10 may include various functional units such as input devices and audio output devices which well-known computers have.

The acquisition unit 11 is a processing unit configured to acquire learning data each labeled a positive or negative type.

In the Embodiment 1, the acquisition unit 11 may acquire learning data by reading the learning data which are retained in an auxiliary memory such as a hard disk or an optical memory disk, or a removal medium such as a memory card or a Universal Serial Bus (USB) memory. In addition, the acquisition unit 11 may acquire learning data by reading the learning data from an external device via a network.

Figure 3:
FIG. 3 is a diagram illustrating examples of learning data, according to an embodiment.

Let us assume here a case where: the acquisition unit 11 acquires learning data illustrated in FIG. 3; and the learning machine 10 learns a model to be used to classify each inputted text into a spam class or a normal class by using a method termed as the perceptron. Incidentally, an example of how the learning machine 10 learns feature combinations is demonstrated using this case. As discussed later, however, the foregoing learning processing is applicable to the learning of sub-structural data such as strings, trees, and graphs.

FIG. 3 is a diagram illustrating examples of the learning data. As illustrated in the upper half of FIG. 3, the acquisition unit 11 acquires texts, each labelled "spam" or "normal", as the learning data. Once the acquisition unit 11 acquires the learning data in this way, the acquisition unit 11, for example, performs a morphological analysis on each text to break down the text into morphemes, and extracts nouns and adjectives included in the texts. Thereby, as illustrated in the lower half of FIG. 3, associations between labels and features are extracted. For example, from a text "Propose a simple speed improvement method" in Line 1, "simple", "speed", and "improvement" are extracted as the features. From a text "sales amount of one million yen or more" in Line 2, "sales amount", "one million yen", and "more" are extracted as the features. From a text "simple improvement in sales amount by one million yen" in Line 3, "simple", "sales amount", "one million yen", and "improvement" are extracted as the features.

An example illustrated in the lower half in FIG. 3 demonstrates that since all the words included in a text with a "spam" label are also included in the other texts each with a "normal" label, the classification between spam and normal is difficult.

To deal with this problem, in the conventional techniques, the feature combinations are obtained in advance by performing the feature expansion processing, as illustrated in FIG. 4. FIG. 4 is a diagram illustrating examples of how features are expanded by feature expansion processing. FIG. 4 illustrates two-word combinations which are made from the words illustrated in FIG. 3. As illustrated in FIG. 4, the total number of feature combinations obtained by combining two words each extracted from the words in each labelled learning data is 22 in comparison with the case illustrated in FIG. 3 where the number of features is 10. This demonstrates that performing the feature expansion processing in advance increases the amount of memory usage. The following descriptions will be provided for how to dynamically perform the feature expansion processing in order to inhibit an increase in the amount of memory usage.

The expansion unit 12 is a processing unit configured to dynamically expand features from the learning data.

For example, the expansion unit 12 selects a piece of unprocessed learning data t from the learning data T acquired by the acquisition unit 11. Subsequently, the expansion unit 12 dynamically expands features from the selected piece of learning data t by using a specified algorithm. For example, in a case where the size for the feature combinations to be obtained by feature expansion processing is set at "2", all the combinations of words whose number is up to maximum of 2 are extracted from the piece of learning data t. To put it specifically, the expansion unit 12 extracts all the words and all the two-word combinations from the piece of learning data t. Incidentally, the number of features to be included in each extracted feature combination is hereinafter referred to as a "feature size" in some cases.

Figure 5:
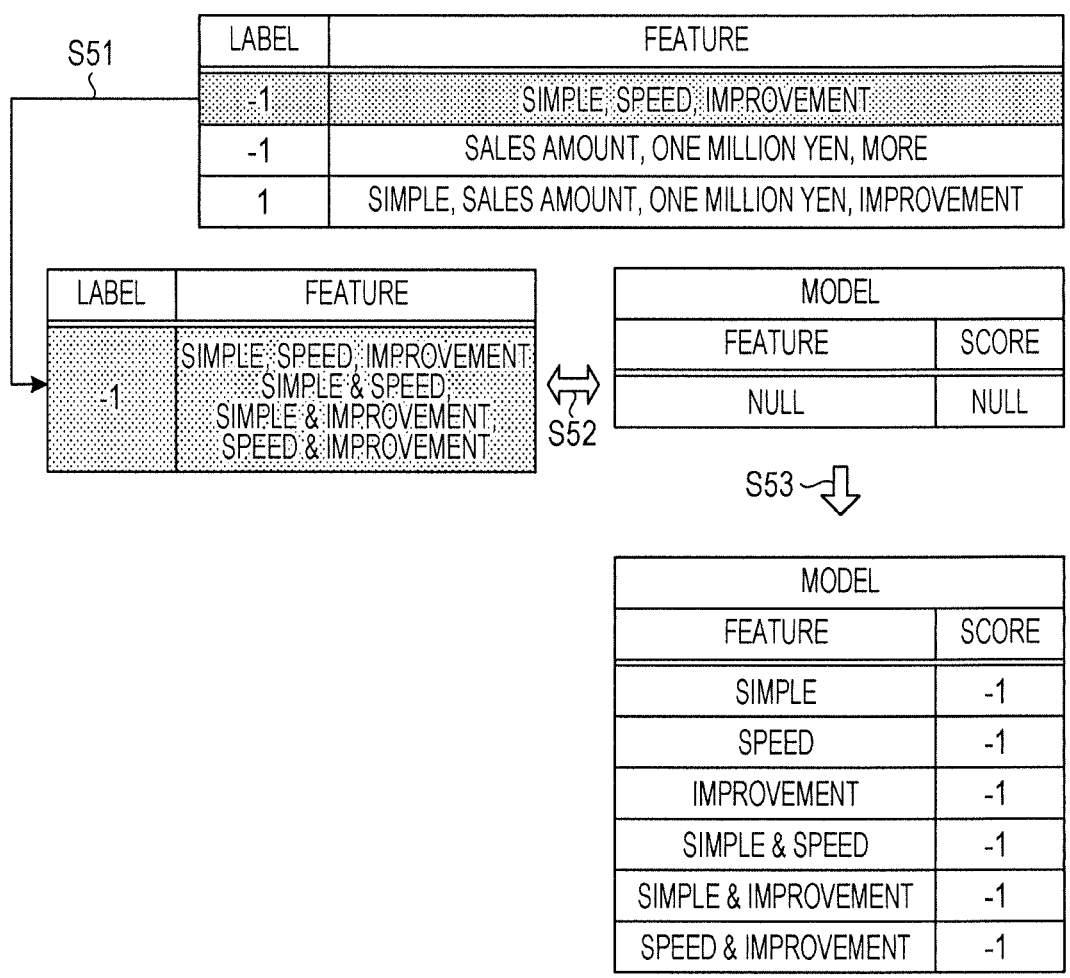
FIG. 5 is a diagram illustrating an example of how features are expanded, and an example of how a model is updated, according to an embodiment.
Figure 6:
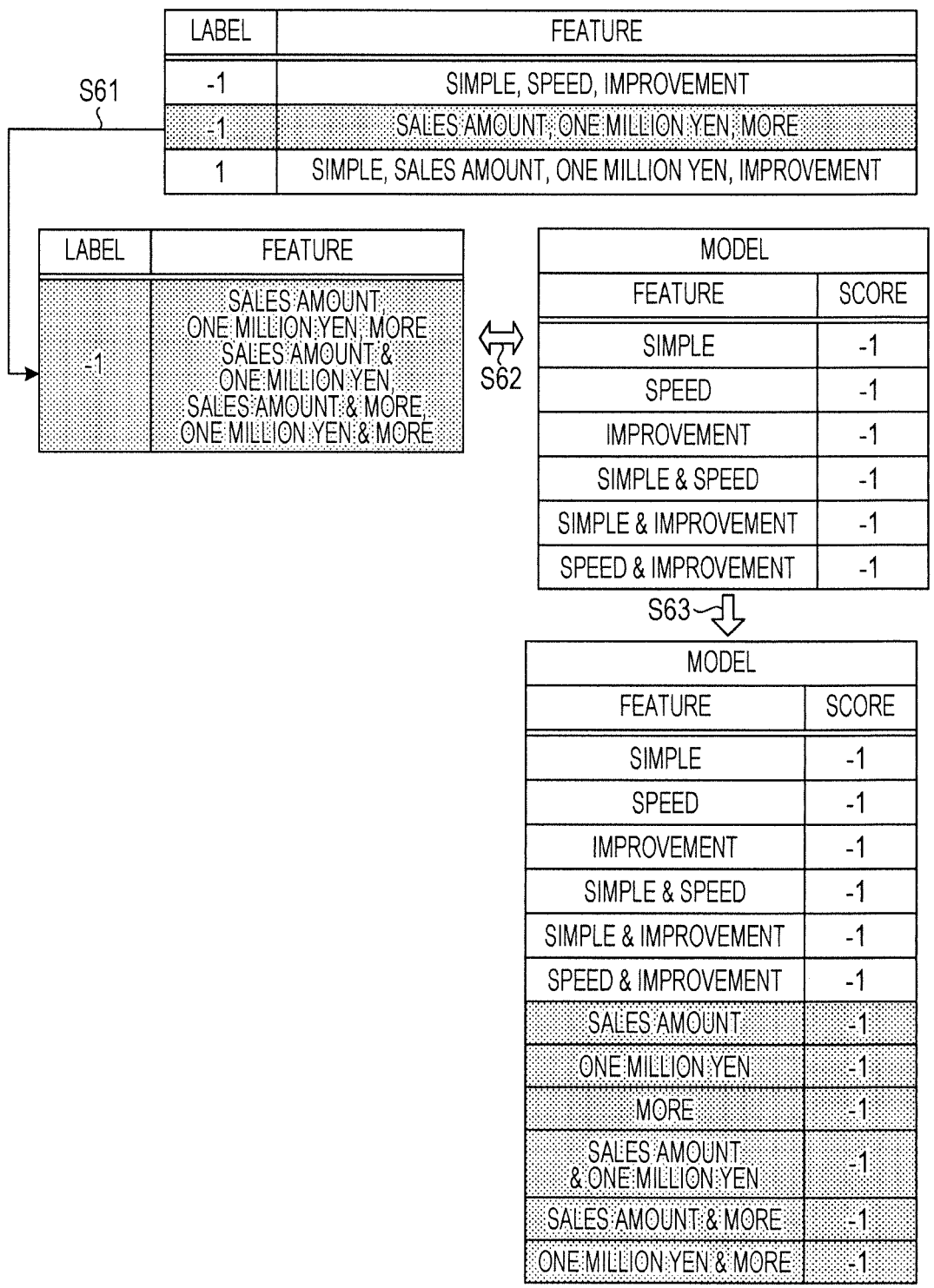
FIG. 6 is a diagram illustrating an example of how features are expanded, and an example of how a model is updated, according to an embodiment.
Figure 7:
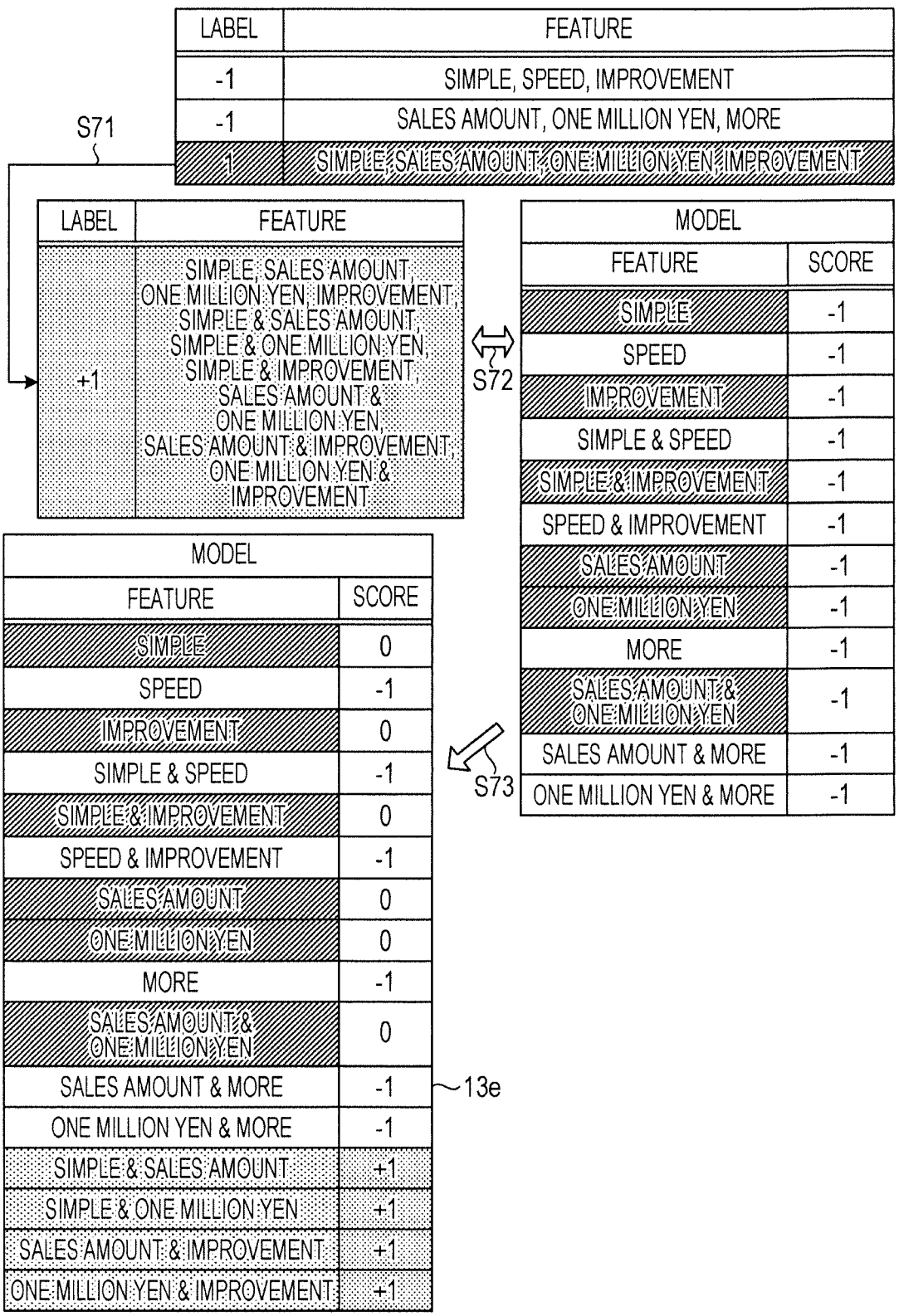
FIG. 7 is a diagram illustrating an example of how features are expanded, and an example of how a model is updated, according to an embodiment.

FIGS. 5 to 7 each illustrates an example of how features are dynamically expanded, and an example of how a model is updated. FIG. 5 demonstrates how a first piece of learning data in Line 1 of the three pieces of learning data illustrated in FIG. 3 is processed. FIG. 6 demonstrates how a second piece of learning data in Line 2 of the three pieces of learning data illustrated in FIG. 3 is processed. FIG. 7 demonstrates how a third piece of learning data in Line 3 of the three pieces of learning data illustrated in FIG. 3 is processed. Let us assume a case where the first piece of learning data in Line 1, the second piece of learning data in Line 2, and the third piece of learning data in Line 3 are processed in this order. Furthermore, in FIGS. 5 to 7, a spam score "+1" or "−1" is assigned to each piece of learning data depending on the label assigned to each piece of learning data, where the score "1" represents spam, and the score "−1" represents normal.

For example, when features "simple", "speed", and "improvement" included in the first piece of learning data illustrated in FIG. 3 are expanded, as demonstrated by S51 in FIG. 5, 6 feature combinations of "simple", "speed", "improvement", "simple & speed", "simple & improvement", and "speed & improvement" are obtained, as expanded features, from the first piece of learning data. In addition, when features "sales amount", "one million yen", and "more" included in the second piece of learning data illustrated in FIG. 3 are expanded, as demonstrated by S61 in FIG. 6, 6 feature combinations of "sales amount", "one million yen", "more", "sales amount & one million yen", "sales amount & more", and "one million yen & more" are obtained, as expanded features, from the second piece of learning data. Furthermore, when features "simple", "sales amount", "one million yen", and "improvement" included in the third piece of learning data illustrated in FIG. 3 are expanded, as demonstrated by S71 in FIG. 7, 10 feature combinations "simple", "sales amount", "one million yen", "improvement", "simple & sales amount", "simple &"one million yen", "simple & improvement", "sales amount & one million yen", "sales amount & improvement", and "one million yen & improvement" are obtained, as expanded features, from the third piece of learning data.

The comparison unit 14 is a processing unit configured to compare each of the expansion features obtained by the expansion unit 12 with the feature combinations in the model stored in the model storage unit 13, by referring to the model.

The model storage unit 13 stores a model in which combinations of features in each text are associated with the respective confidence values. This model is vacant when the learning processing is started. The model is updated each time a new feature combination and its associated confidence value are registered in the model by the update unit 15, and each time the confidence values associated with the respective existing feature combinations are updated by the update unit 15. The "confidence value" indicates a degree of confidence for a feature, and, in this case, represents the likelihood of being spam. For this reason, the confidence value is hereinafter also referred to as a "spam score" for the sake of convenience.

For example, the comparison unit 14 compares the feature combinations obtained by the expansion unit 12 from the learning data t with the feature combinations included in the model stored in the model storage unit 13. For example, the comparison unit 14 selects one from among the feature combinations obtained by the expansion unit 12, and determines whether any one of the feature combinations included in the model is matched with the previously-selected feature combination obtained from the learning data t. When there is a feature combination matched between the model and the learning data t, the comparison unit 14 adds the spam score associated with the matched feature combination in the model, to the corresponding cumulative spam score value which is stored in a work area in an internal memory, albeit not illustrated. In this way, the comparison unit 14 repeatedly performs the above comparison processing, until the spam score addition is performed for all the feature combinations obtained by the expansion unit 12.

The update unit 15 is a processing unit configured to update the model stored in the model storage unit 13.

In the Embodiment 1, the update unit 15 updates the model when the result of the processing by the comparison unit 14 is inconsistent with the label, that is to say, when the learning data is classified into a wrong class. For example, in a case where as discussed above, a label of "+1" indicating spam or a label of "−1" indicating normal is assigned to the learning data T, it is determined that learning data is classified into the wrong class when the sign of the cumulative spam score value of the learning data becomes different from the sign of the label assigned to the learning data, or when the cumulative spam score value thereof becomes equal to 0 (zero). When it is determined that the learning data is classified into the wrong class, the update unit 15 updates the model such that: combinations that are obtained by the expansion unit 12 and unmatched with the feature combinations in the model are added to the model; and out of the confidence values included in the model, confidence values that are associated with the feature combinations obtained from the learning data t are updated based on the label of the learning data.

In an example illustrated in FIG. 5, the 6 feature combinations generated in S51 as expanded features, that is, "simple", "speed", "improvement", "simple & speed", "simple & improvement", and "speed & improvement", are compared with the model (S52). In this stage, since no feature combinations are registered in the model, the model includes no feature combinations which are matched with any one of the feature combinations obtained by the expansion unit 12. Accordingly, the spam score total is set at 0 (zero). In this case, the 6 feature combinations obtained in S51, that is to say, "simple", "speed", "improvement", "simple & speed", "simple & improvement", and "speed & improvement", are added to the model in the model storage unit 13. At this time, the spam score "−1" assigned to the "negative type" label of the learning data t is associated with each added feature combination (S53).

Furthermore, in an example illustrated in FIG. 6, the 6 feature combinations generated as expanded features in S61, that is, "sales amount", "one million yen", "more", "sales amount & one million yen", "sales amount & more", and "one million yen & more", are compared with the model (S62). In this stage, there are feature combinations registered in the model. However, the feature combinations registered in the model are unmatched with the feature combinations obtained in S61. Accordingly, the spam score total is set at 0 (zero). In this case, the 6 feature combinations obtained in S61, that is to say, "sales amount", "one million yen", "more", "sales amount & one million yen", "sales amount & more", and "one million yen & more", are added to the model in the model storage unit 13. At this time, the spam score "−1" assigned to the "negative type" label of the learning data t is associated with each added feature combination (S63).

Moreover, in an example illustrated in FIG. 7, the 10 feature combinations generated as expended features in S71, that is, "simple", "sales amount", "one million yen", "improvement", "simple & sales amount", "simple & one million yen", "simple & improvement", "sales amount & one million yen", "sales amount & improvement", and "one million yen & improvement", are compared with the model (S72). In this stage, feature combinations in the model corresponding to the hatching illustrated in FIG. 7 are matched with some of the feature combinations obtained from the learning data t in S71. In other words, the feature combinations "simple", "improvement", "simple & improvement", "sales amount", "one million yen", and "sales amount & one million yen" in the learning data are matched with those in the model.

In this case, "−6" is a total value of the spam scores associated with feature combinations included in the model and matched with the feature combinations obtained from the learning data t in S71. In this example, the label of the learning data t represents a positive type, and the "plus" sign of the label of the learning data t is different from the "minus" sign of the total value of the spam scores. For this reason, it is determined that the learning data t is classified into the wrong class. Accordingly, as discussed below, the model is updated (S73). To put it specifically, the spam score "+1" assigned to the "positive type" label of the learning data t is added to the current spam scores respectively associated with feature combinations included in the model and matched with the feature combinations obtained from the learning data t in S71. In other words, the spam score "+1" is added to the feature combinations of "simple", "improvement", "simple & improvement", "sales amount", "one million yen", and "sales amount & one million yen" in the model. Thus, the spam scores respectively associated with the feature combinations of "simple", "improvement", "simple & improvement", "sales amount", "one million yen", and "sales amount & one million yen" becomes equal to 0 (zero). Furthermore, feature combinations included in the feature combinations obtained from the learning data t in S71 and unmatched with the feature combinations included in the model are added to the model. In other words, feature combinations that are included in the 10 feature combinations obtained in S71 and unmatched with the feature combinations included in the model, that is, "simple & sales amount", "simple & one million yen", "sales amount & improvement", and "one million yen & improvement" are added to the model in the model storage unit 13. When added to the model in the model storage unit 13, these feature combinations are associated with the spam score "+1" assigned to the "positive type" label of the learning data t.

As a result of the foregoing expansion and update, a model 13e illustrated in FIG. 7 is obtained. The comparison between the model 13e illustrated in FIG. 7 and the learning data in Line 1 illustrated in FIG. 3 makes the spam score total of the learning data equal to "−3". Furthermore, the comparison between the model 13e illustrated in FIG. 7 and the learning data in Line 2 illustrated in FIG. 3 makes the spam score total of the learning data equal to "−3". Moreover, the comparison between the model 13e illustrated in FIG. 7 and the learning data in Line 3 illustrated in FIG. 3 makes the spam score total of the learning data equal to "4". In this way, the model 13e illustrated in FIG. 7 makes it possible to derive the results of the learning data classifications which are consistent with their labels. Further, the number of feature combinations obtained from the three pieces of learning data illustrated in FIG. 3 is able to be reduced from 22 in a case where all the two-word combinations are obtained as feature combinations, to 16 in a case where the expansion and update are performed as illustrated in FIGS. 5 to 7. Accordingly, it is possible to inhibit an increase in the amount of memory usage.

Figure 8:
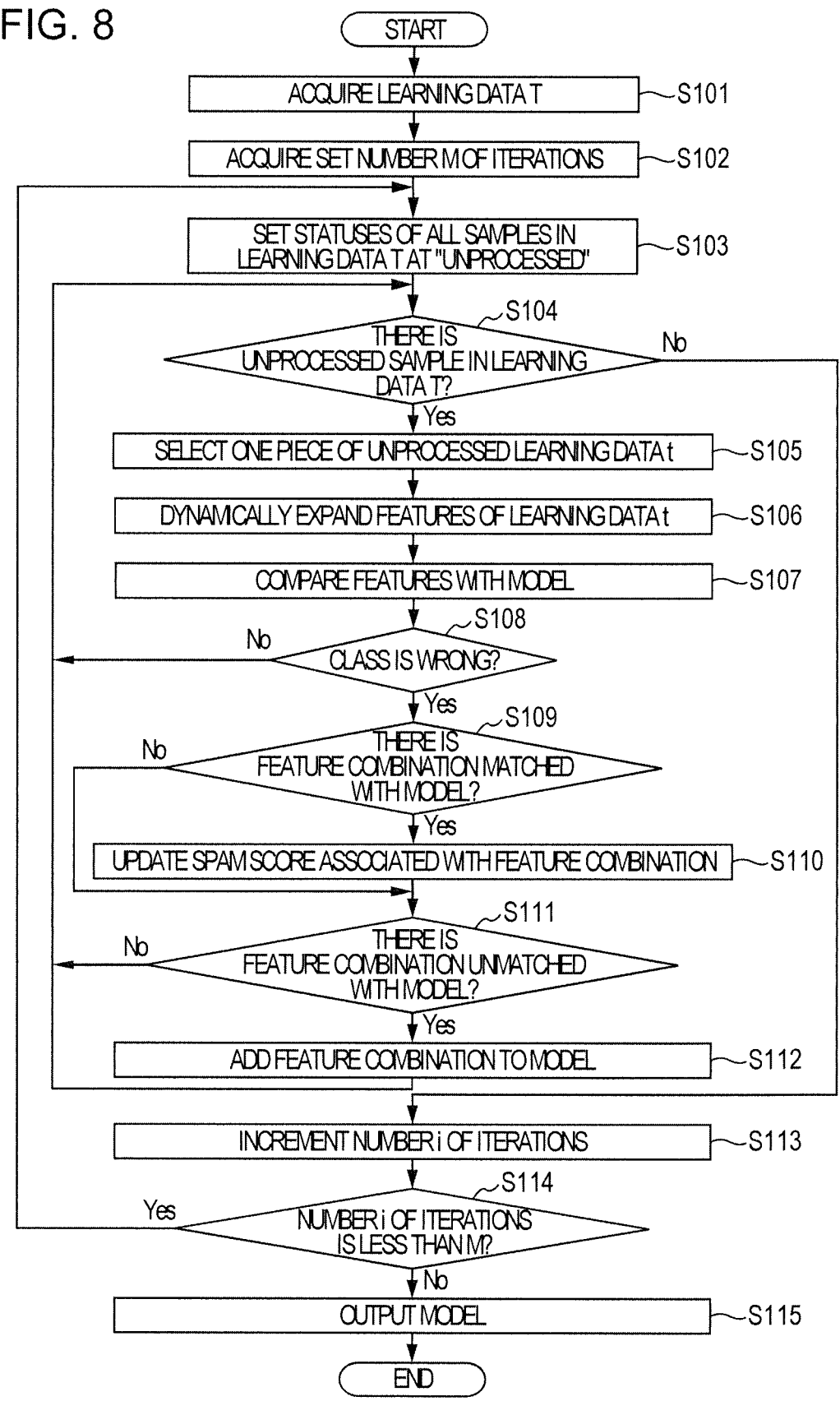
FIG. 8 is a diagram illustrating an example of an operational flowchart for learning processing, according to an embodiment.

FIG. 8 is a flowchart illustrating a procedure for the learning processing in the Embodiment 1. This learning processing is able to be activated when the learning processing is directed by the inputting of the direction using the input unit or the like, or automatically activated when a learning datum is acquired.

As illustrated in FIG. 8, the acquisition unit 11 acquires the learning data T, and the set number M of iterations of the learning (steps S101 and S102). Depending on precision desired by the model, the number M of iterations may be set at an arbitrarily-selected value in advance. Incidentally, it does not matter which of the processes in steps S101 and S102 is performed earlier. The processes in steps S101 and S102 may be performed in parallel.

Subsequently, the acquisition unit 11 sets the statuses of all the samples in the learning data T acquired in step S101, for examples their flags or the like, at "unprocessed" (step S103). As long as there is an unprocessed learning data sample left in the learning data T (Yes in step S104), the processes in step S105 and the ensuing steps are performed.

To put it specifically, the expansion unit 12 selects one piece of unprocessed learning data t from the learning data T acquired in step S101 (step S105). Subsequently, using a specified algorithm, the expansion unit 12 dynamically expands the features of the piece of learning data t selected in step S105 (step S106). For example, in a case where combinations of up to two words are generated as expanded features, all the words and all the two-word combinations are generated as feature combinations from the piece of learning data t. Subsequently, the comparison unit 14 compares the feature combinations obtained by the expansion unit 12 from the piece of learning data t with the feature combinations included in the model stored in the model storage unit 13 (step S107).

Thereafter, when it is determined that the learning data t is classified into the wrong class according to the spam score total obtained by the comparison in step S107 (Yes in step S108), the update unit 15 determines whether there is a feature combination in the model which is matched with the feature combinations obtained in the step S106 (step S109). On the other hand, when the learning data t is not classified into the wrong class (No in step S108), the model is not updated and the process step proceeds to step S104.

When there is a feature combination in the model which is matched with the feature combinations obtained in the step S106 (Yes in step S109), the update unit 15 updates the model by adding the spam score assigned to the label of the learning data t to the current spam scores respectively associated with the feature combinations included in the model and matched with the feature combinations obtained from the learning data t in the step S106 (step S110). Incidentally, in the case of No in step S109, the process in step S110 is skipped.

Furthermore, when there is a feature combination obtained in the step S106 which is unmatched with the feature combinations included in the model (Yes in step S111), the update unit 15 adds the feature combination unmatched with the feature combinations included in the model, to the model in the model storage unit 13 (step S112). At this time, the confidence value associated with the feature combination to be added to the model is set depending on the label of the learning data t. Incidentally, in the case of No in step S111, the process in step S112 is skipped. Thereafter, the process step proceeds to step S104.

Subsequently, when no unprocessed sample of learning data is included in the learning data T (No in step S104), the number i of iterations of the trial retained in a register or the like, albeit not illustrated, is incremented (step S113).

Thereafter, when the number i of iterations of the trial is less than the number M of iterations acquired in step S102

(Yes in step S114), the process step proceeds to step S103 discussed above, and the processes from S103 through step S113 are performed repeatedly.

Meanwhile, when the number i of iterations of the trial reaches the number M of iterations acquired in step S102 (No in step S114), the update unit 15 outputs the model stored in the model storage unit 13 to a predetermined output destination (step S115), and the learning processing is terminated. Incidentally, examples of the output destination of the model include an application program for performing a mail filtering process. Further, in a case where the generation of a model is requested from an external device, the generated model may be returned to the externa device which originates the request.

[Aspect of Effect]

As discussed above, the learning machine 10 of the Embodiment 1 classifies pieces of learning data by: generating only the features included the model as expanded features; and calculating the total score value of the pieces of learning data by using the scores registered in the model. When the learning data is classified into a wrong class, the learning machine 10 updates the model by using only expanded features generated from the misclassified example. Thereby, the learning is feasible by generating, as expanded features, only feature combinations to be used for the classification instead of all the feature combinations, and the feature combinations no longer have to be generated explicitly in advance. The learning machine 10 of the Embodiment 1 is able to reduce an amount of memory usage smaller.

Embodiment 2

Embodiment 1 given above discusses the example where the feature combinations whose size is up to the maximum of the value indicated by the specified feature size are used to update the model. However, the feature size to be used for the model update may not be increased to the specified feature size from the beginning. The feature size may be changed on a step-by-step basis. With this taken into consideration, Embodiment 2 discusses an example where for learning data, the feature size to be used for the model update is changed on a step-by-step basis for each piece of learning data, depending on a classification error frequency, for example, the number of classification errors (error count) in each piece of learning data.

Figure 9:
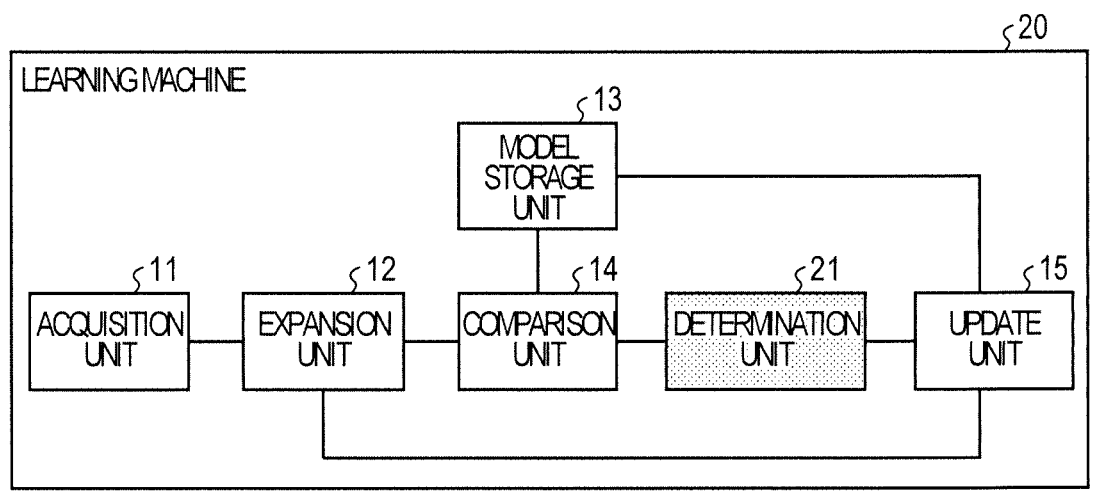
FIG. 9 is a diagram illustrating an example of a functional configuration of a learning machine, according to an embodiment.

FIG. 9 is a block diagram illustrating a functional configuration of the learning machine in the Embodiment 2. The learning machine 20 illustrated in FIG. 9 performs the learning processing by using an algorism indicated in FIG. 10. FIG. 10 is a diagram illustrating an example of a pseudo algorithm for an error-based perceptron. "x" illustrated in FIG. 10 represents a character string; and $\varphi(x)$ represents a function for mapping, onto a vector, a feature combination obtained by expanding features in the character string x. Furthermore, "w" represents a weight vector. For example, in a d-dimensional vector space, "$w_r$" represents a d-dimensional weight vector in an r-th round. Incidentally, also in FIG. 10, "w" is not italicized for the sake of word processing convenience like in FIG. 2, the italicized form is actually used for "w" in the actual mathematical notation.

The algorithm illustrate in FIG. 10 is common to the algorithm illustrated in FIG. 2 in that the learning machine 20 dynamically expands features, but different from the algorithm illustrated in FIG. 2 in that the feature size to be used for the model update is changed on the step-by-step basis. For example, even if it is determined that a learning data sample $x_t$ is classified into a wrong class, the learning machine 20 does not uniformly set the feature size to be used for the model update at a maximum one. To put it more specifically, when the learning data sample $x_t$ is classified into a wrong class, the learning machine 20 compares the maximum feature size L allowed for the model to be updated, with the error count $E[x_t]$ representing how many errors are made in classifying the learning data sample $x_t$. The feature size allowed to be used for the model update is hereinafter referred to as a "maximum feature size" in some cases. The feature size I to be used for the current model update is set at a minimum value between the maximum feature size L and the error count $E[x_t]$ by the learning machine 20. The feature combinations are obtained, as expansion features, from the learning data sample $x_t$ depending on the update feature size I, and the thus-obtained feature combinations are used for the model update.

In a case where the algorithm illustrated in FIG. 10 is used, the update feature size I to be used for the model update is equal to the error count $E[x_t]$ until the error count $E[x_t]$ reaches the maximum feature size L. In addition, in a case where the updating of the model leads to successful classification of the learning data sample x before the error count $E[x_t]$ reaches the maximum feature size L, the update feature size I does not have to be increased to the maximum feature size L for the learning data sample x. In other words, it is possible to make the size of the model smaller than in the case where the update feature size I is increased to the maximum feature size L. Meanwhile, in a case where the successful classification of the learning data sample x is not achieved even though the error count $E[x_t]$ reaches the maximum feature size L, the update feature size I may be increased to the maximum feature size L. Thereby, it is possible to inhibit a decrease in learning precision. The algorithm illustrated in FIG. 10 makes it possible to make the size of the model smaller while inhibiting the decrease in the learning precision.

The learning machine 20 illustrated in FIG. 9 is different from the learning machine 10 illustrated in FIG. 1 in that the learning machine 20 includes a determination unit 21 configured to make a determination on the error count. Incidentally, in FIG. 9, the functional units which exert the same functions as those of the learning machine 10 illustrated in FIG. 1 are denoted by the same reference signs, and descriptions for such functional units are omitted. Furthermore, the determination unit 21 is an example of a setting unit.

The determination unit 21 retains error data in which an error count indicating how many errors are made in classifying each learning data sample is associated with each learning data sample. Under this error data management, the determination unit 21 performs the following processing in a case where the result of the process by the comparison unit 14 is inconsistent with the label, that is to say, in a case where the sign of the cumulative spam score value is different from the sign of the label, or in a case where the cumulative spam score value becomes equal to 0 (zero). To put it specifically, the determination unit 21 updates an error count included in the error data and associated with the misclassified learning data sample, for example, by incrementing the error count. Thereafter, the determination unit 21 determines whether the thus-updated error count is less than the maximum feature size, that is, whether the error count<the maximum feature size L.

When the error count<the maximum feature size L, the determination unit 21 sets the update feature size I at the value of the error count. On the other hand, when the error count the maximum feature size L, the determination unit 21 sets the update feature size I at the value of the maximum feature size L. Based on the thus-set update feature size I, the determination unit 21 obtains feature combinations by expanding features in the learning data sample.

Thereafter, the update unit 15 updates the model such that: the feature combinations obtained by the determination unit 21 and unmatched with the feature combinations in the model are added to the model; and out of the confidence values included in the model, confidence values associated with the feature combinations matched with the feature combinations obtained by the determination unit 21 are updated based on the label.

SPECIFIC EXAMPLE

Next, by demonstrating a specific example, descriptions are provided for how different the model size is between the model update discussed in the Embodiment 1 and the model update in the embodiment 2.

(1) Model Update in Embodiment 1

Figure 11:
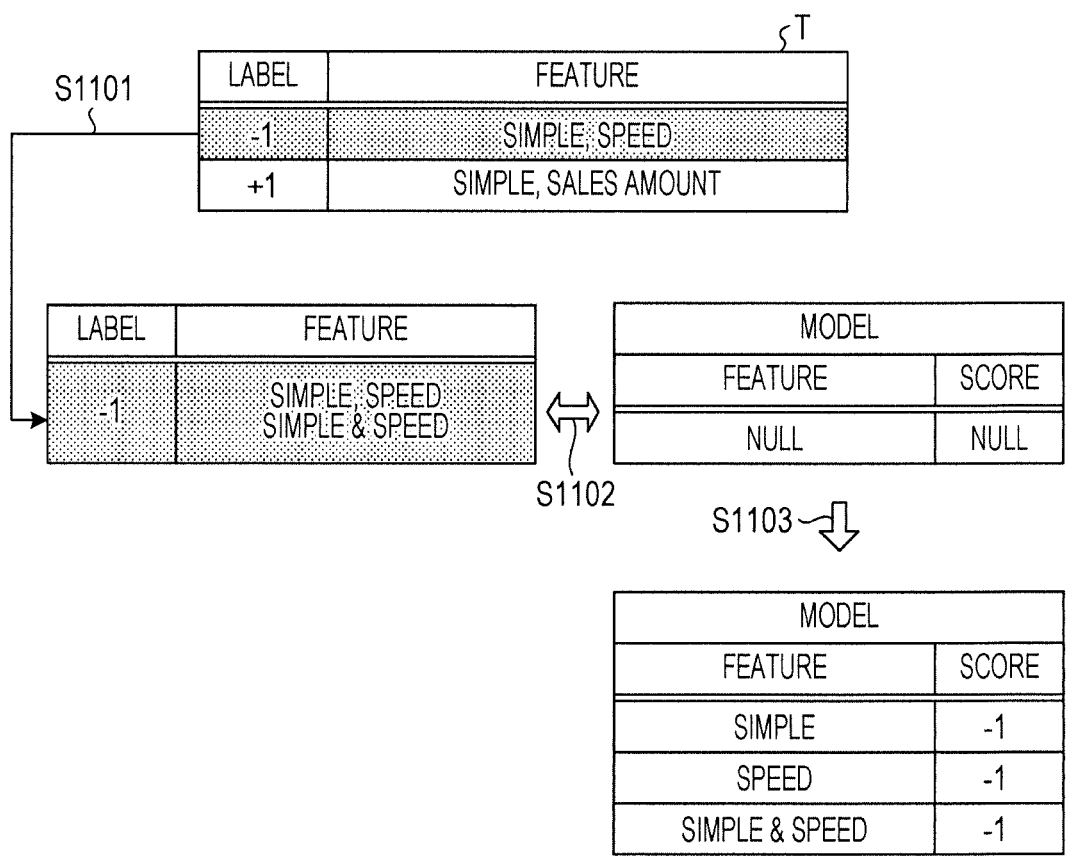
FIG. 11 is a diagram illustrating an example of how a learning sample is compared with a model, according to an embodiment.
Figure 12:
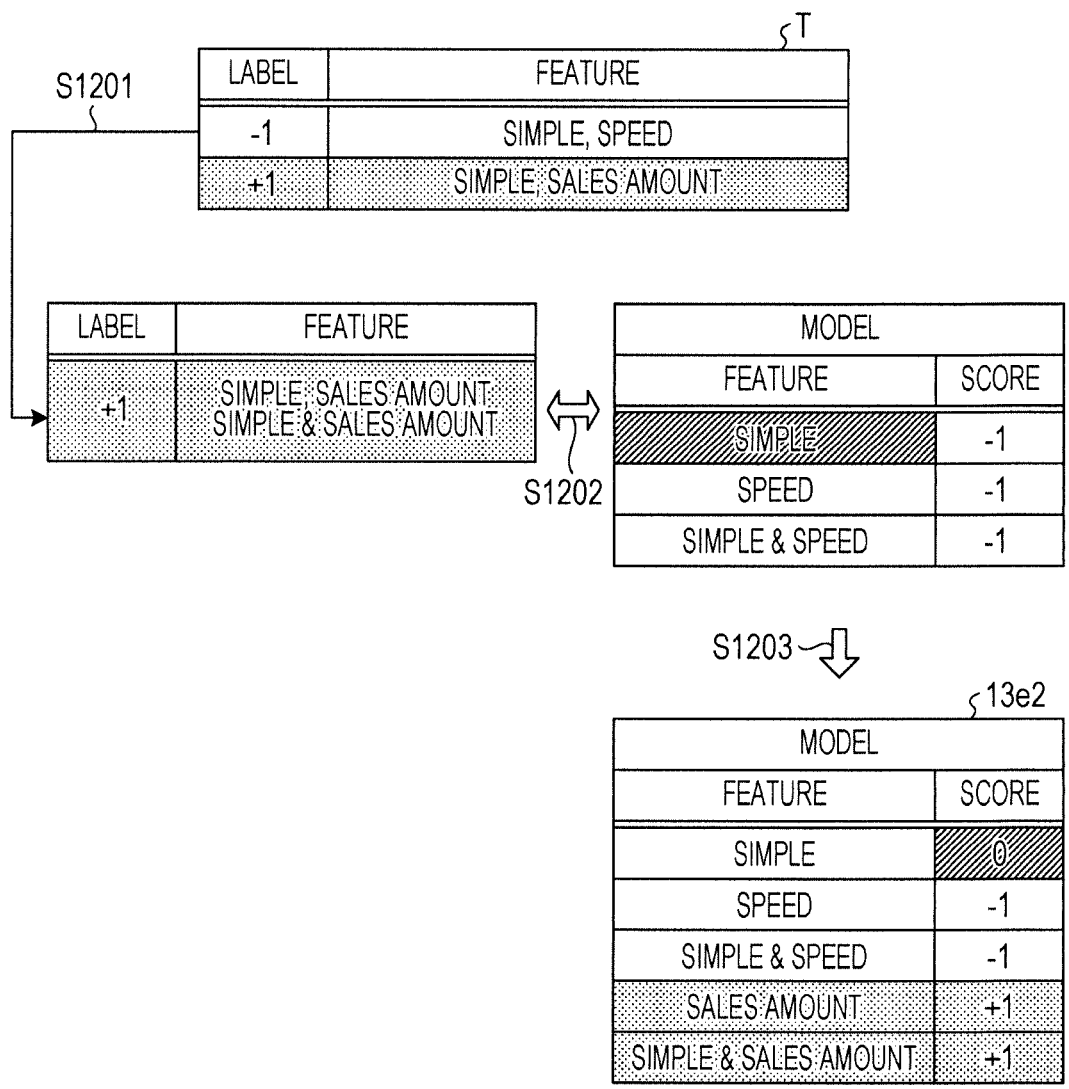
FIG. 12 is a diagram illustrating an example of how a learning sample is compared with a model, according to an embodiment.
Figure 13:
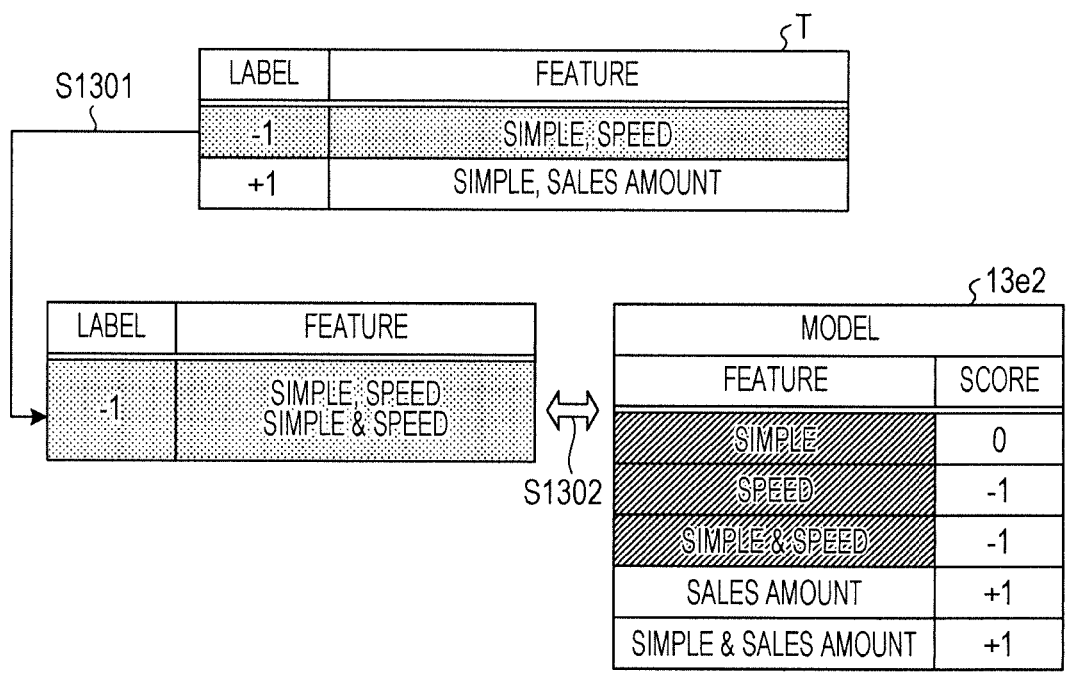
FIG. 13 is a diagram illustrating an example of how a learning sample is compared with a model, according to an embodiment.
Figure 14:
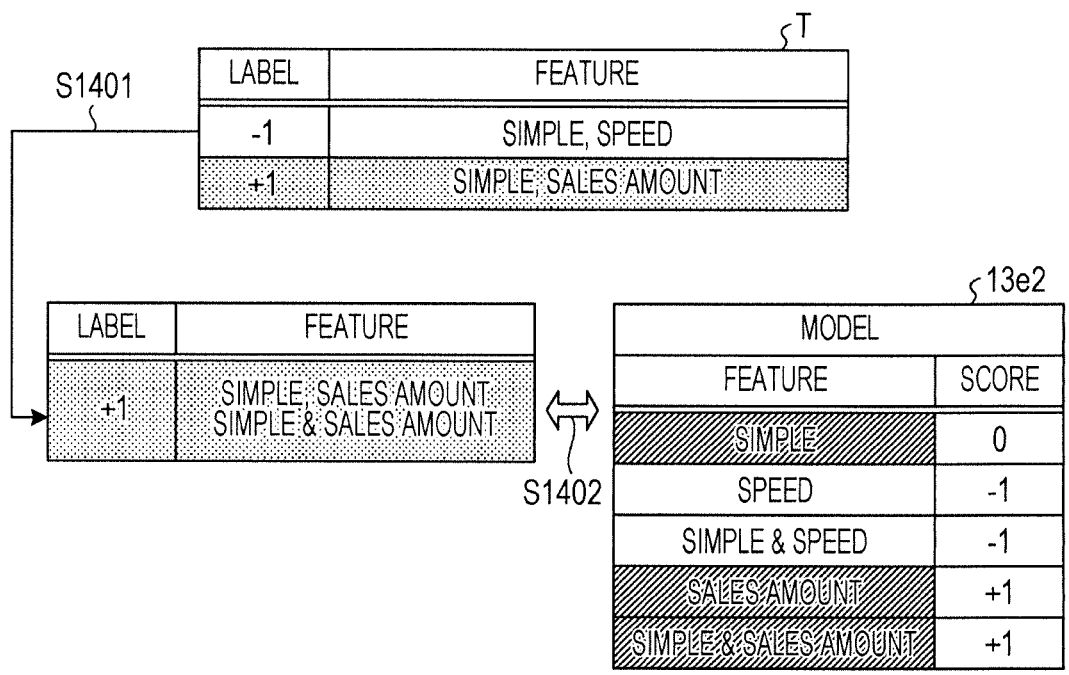
FIG. 14 is a diagram illustrating an example of how a learning sample is compared with a model, according to an embodiment.

FIGS. 11 to 14 are diagrams illustrating an example of how learning samples are compared with a model. FIGS. 11 to 14 illustrate the example of the model update in the Embodiment 1. FIG. 11 illustrates comparison of a first sample in Line 1 of the learning data T in FIG. 11 in a first comparison round where the first sample is compared with an initial model. FIG. 12 illustrates comparison of a second sample in Line 2 in the first comparison round where the second sample is compared with an updated model illustrated in FIG. 11. FIG. 13 illustrates comparison of the first sample in Line 1 of the learning data T in FIG. 13 in a second comparison round where the first sample is compared with an updated model illustrated in FIG. 12. FIG. 14 illustrates comparison of the second sample in Line 2 in the second comparison round where the second sample is compared with the compared model illustrated in FIG. 13.

For example, in the first round, as illustrated in FIG. 11, three feature combinations of "simple", "speed", and "simple & speed" are generated as expanded features by the expansion unit 12 from the first sample (step S1101). The three feature combinations thus generated in step S1101, that is, "simple", "speed", and "simple & speed", are compared with the model (step S1102). In this initial stage, the model is vacant, and no feature combinations are registered in the model. Accordingly, the model includes no feature combinations which are matched with any of the feature combinations generated by the expansion unit 12, and the spam score total is set at 0 (zero). For this reason, the three feature combinations thus generated in step S1101, that is, "simple", "speed", and "simple & speed", are added to the model in the model storage unit 13. At this time, the spam score "−1" assigned to the "negative type" label of the first sample is associated with each added feature combination (step S1103).

In the first round, subsequently, as illustrated in FIG. 12, three feature combinations "simple", "sales amount", and "simple & sales amount" are generated as expended features by the expansion unit 12 from the second sample (step S1201). The three feature combinations thus generated in step S1201, that is, "simple", "sales amount", and "simple & sales amount", are compared with the model (step S1202). In this step, a feature combination in the model corresponding to the hatching in FIG. 11 is matched with one of the feature combinations generated from the second sample in step S1201. In other words, the feature combination "simple" included in the learning data is matched with the feature combination "simple" in the model. In this case, except for the feature combination "simple", the learning data includes no feature combination which is matched with any one of the feature combinations in the model. The spam score total is set at "−1". The label of the second sample represents a positive type. Since the "minus" sign of the span score total is different from the "plus" sign of the label of the second sample, it is determined that the second sample is classified into a wrong class.

In this case, as discussed below, the model is updated (step S1203). To put it specifically, the spam score "+1" assigned to the "positive type" label of the second sample is added to the current spam scores respectively associated with feature combinations included in the model and matched with the feature combinations generated from the second sample in step S1201. In other words, the spam score "+1" is added to the feature combination "simple" in the model. Thus, the spam score associated with the feature combination "simple" becomes equal to "0" (zero). In addition, feature combinations generated from the second sample in step S1201 and unmatched with any one of the feature combinations included in the model are added to the model. To put it specifically, out of the three feature combinations generated in step S1201, "sales amount" and "simple & sales amount" are added to the model in the model storage unit 13. In this case, the spam score "+1" assigned to the "positive type" label of the second sample of the learning data T is associated with each added feature combination. A model 13e2 is obtained through the comparison and update in the first round.

Thereafter, in the second round, as illustrated in FIG. 13, three feature combinations "simple", "speed", and "simple & speed" are generated as expanded features by the expansion unit 12 from the first sample (step S1301). The three feature combinations thus generated in step S1301, that is, "simple", "speed", and "simple & speed", are compared with the model (step S1302). In this second round, the feature combinations "simple", "speed", and "simple & speed" in the model 13e2 corresponding to the hatching illustrated in FIG. 13 are matched with the feature combinations "simple", "speed", and "simple & speed" generated from the first sample in step S1301. In this case, the spam score total becomes equal to "−2 (=0−1−1)". The label of the first sample represents a negative type. Since the "minus" sign of the spam score total coincides with the "minus" sign of the label of the first sample, it is determined that the first sample is classified into a correct class. Thus, the model 13e2 stored in the model storage unit 13 is not updated.

In the second round, subsequently, as illustrated in FIG. 14, three feature combinations "simple", "sales amount", and "simple & sales amount" are generated by the expansion unit 12 from the second sample (step S1401). The three feature combinations thus generated in step S1401, that is, "simple", "sales amount", and "simple & sales amount", are compared with the model (step S1402). In this second round, the feature combinations "simple", "sales amount", and "simple & sales amount" in the model 13e2 corresponding to the hatching in FIG. 14 are matched with the feature combinations "simple", "sales amount", and "simple & sales amount" generated from the second sample in step S1401. In this case, the spam score total becomes equal to "+2 (=0+1+1)". The label of the second sample represents a positive type. Since the "plus" sign of the spam score total coincides with the "plus" sign of the label of the second sample, it is determined that the first sample is classified into a correct class. Thus, also for the second sample, the model 13e2 stored in the model storage unit 13 is not updated.

The comparison using the model 13e2 like this makes it possible to derive the results of classifying the first and second samples which are consistent with their labels.

(2) Model Update in Embodiment 2

Figure 15:
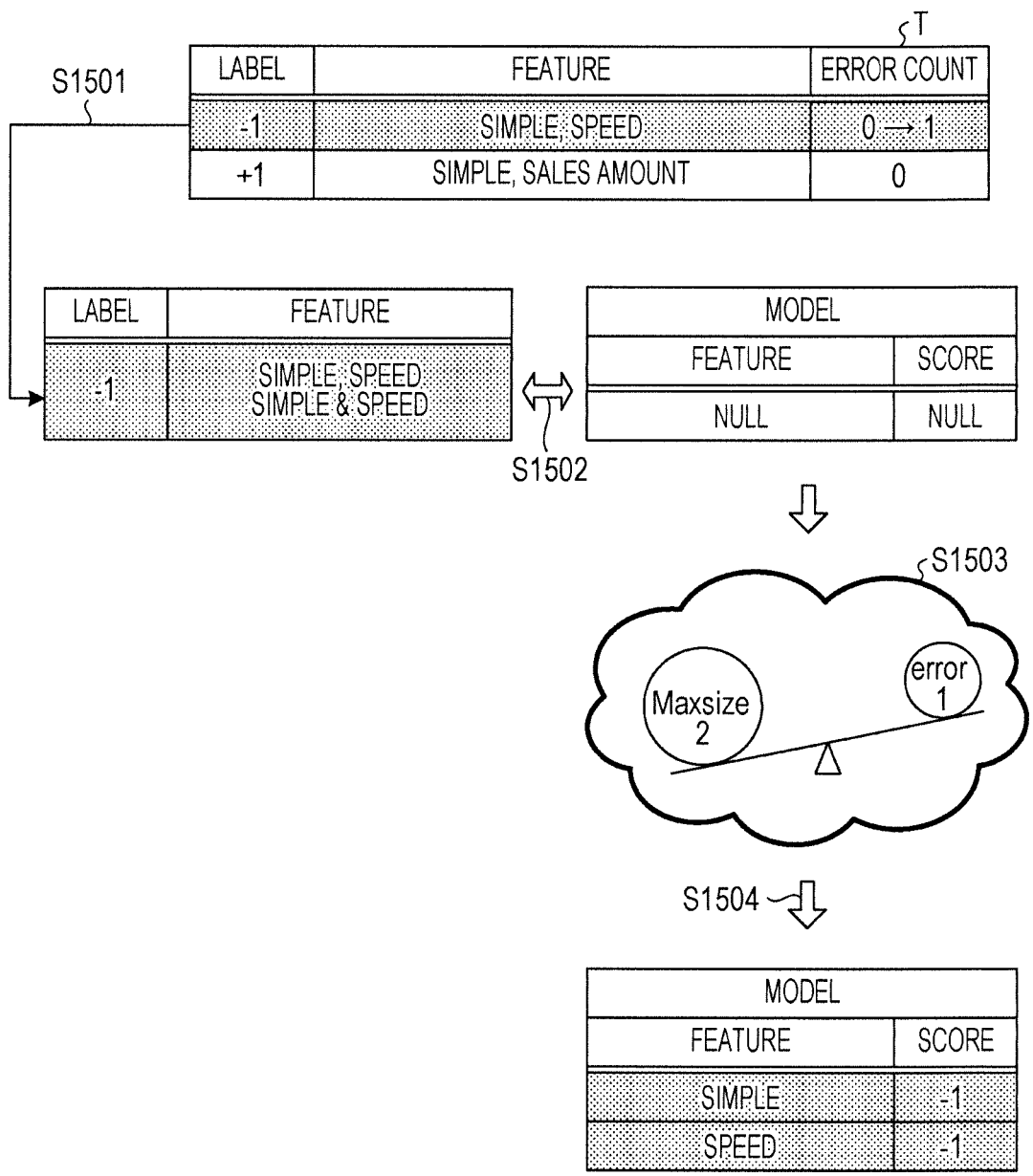
FIG. 15 is a diagram illustrating an example of how a learning sample is compared with a model, according to an embodiment.
Figure 16:
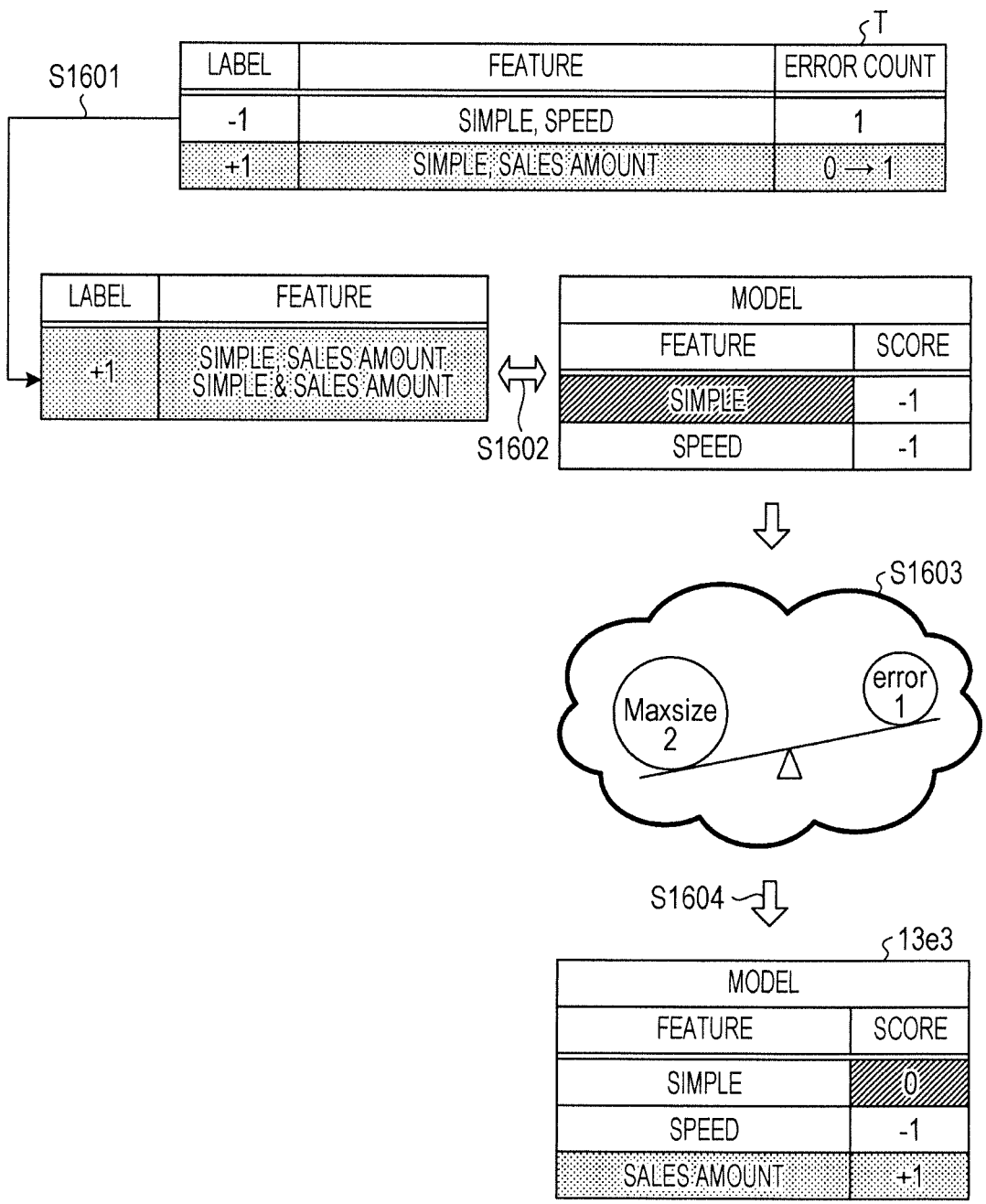
FIG. 16 is a diagram illustrating an example of how a learning sample is compared with a model, according to an embodiment.
Figure 17:
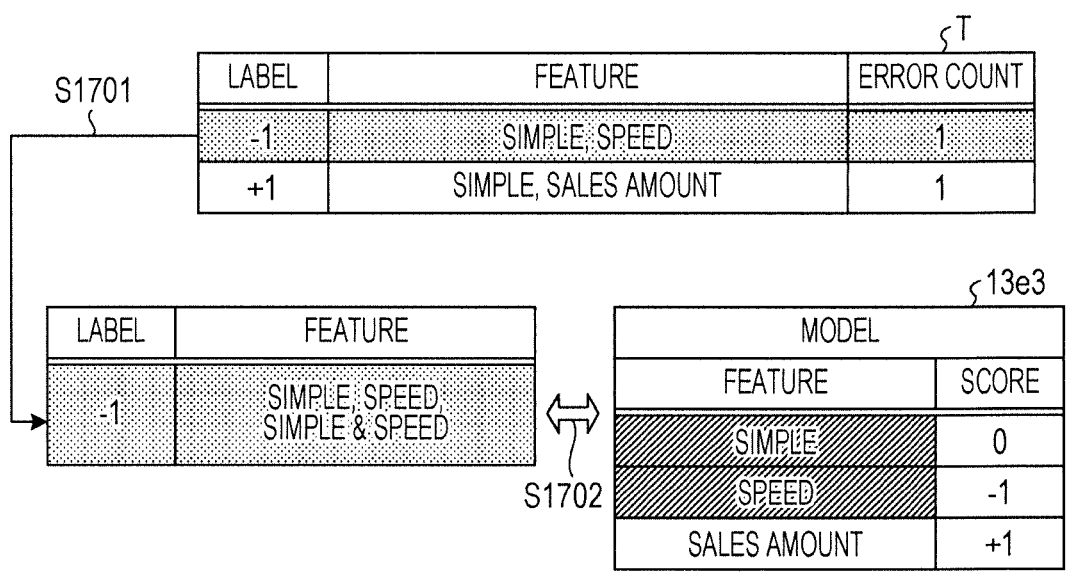
FIG. 17 is a diagram illustrating an example of how a learning sample is compared with a model, according to an embodiment.
Figure 18:
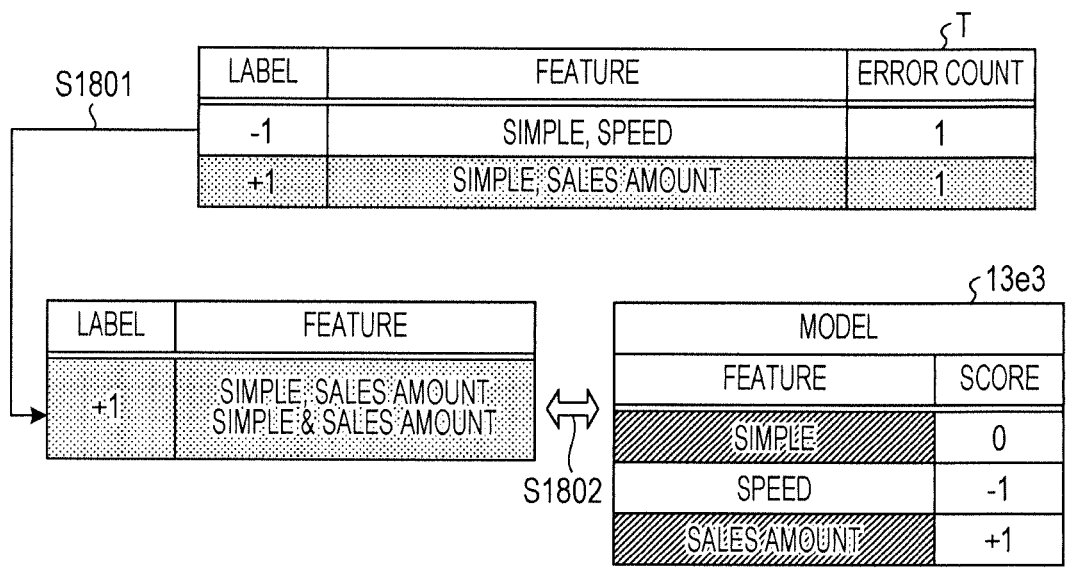
FIG. 18 is a diagram illustrating an example of how a learning sample is compared with a model, according to an embodiment.

FIGS. 15 to 18 are diagrams illustrating an example of comparison between learning samples and a model. FIGS. 15 to 18 illustrate the example of the model update in the Embodiment 2. FIG. 15 illustrates comparison of a first sample in Line 1 of the learning data T in FIG. 15 in a first comparison round where the first sample is compared with an initial model. FIG. 16 illustrates comparison of a second sample in Line 2 in the first comparison round where the second sample is compared with an updated model illustrated in FIG. 15. FIG. 17 illustrates comparison of the first sample in Line 1 of the learning data T in FIG. 17 in a second comparison round where the first sample is compared with an updated model illustrated in FIG. 16. FIG. 18 illustrates comparison of the second sample in Line 2 in the second comparison round where the second sample is compared with a comparison model illustrated in FIG. 17. Incidentally, FIGS. 15 to 18 illustrate the example in which each sample in the learning data T is provided with an error count to be stored in the work area in the memory.

For example, in the first round, as illustrated in FIG. 15, three feature combinations "simple", "speed", and "simple & speed" are generated as expanded features by the expansion unit 12 from the first sample (step S1501). Unlike an update feature size I to be used for the model update, the feature size for, as discussed above, generating the feature combinations to be compared with the model is fixed at a size which is the maximum feature size L, as in the case of the foregoing Embodiment 1. Subsequently, the three feature combinations generated in step S1501, that is, "simple", "speed", and "simple & speed", are compared with the model (step S1502). When the first sample is compared with the model in the first round, in the initial stage, the model is vacant, and no feature combination is registered in the model. Accordingly, the model includes no feature combination which is matched with any one of the feature combinations generated by the expansion unit 12, and the spam score total is set at 0 (zero).

In the case where the spam score total is set at 0 (zero), it is determined that the first sample is classified into a wrong class. Thus, the determination unit 21 increments the error count of the first sample by one. Thereafter, the error count $E[x_i]$ is compared with the maximum feature size L (step S1503). Since the obtained determination result is the error count "1"<the maximum feature size "2", the update feature size I is set at a value of the error count "1". Based on the update feature size I set at "1", feature combinations "simple" and "speed" are generated from the first sample, and serve as the feature combinations to be used for the model update for the first sample in the first round. Thus, the two feature combinations "simple" and "speed" are added to the model in the model storage unit 13. At this time, the spam score "−1" assigned to the "negative type" label of the first sample is associated with each feature combination (step S1504).

In the first round, subsequently, as illustrated in FIG. 16, three feature combinations "simple", "sales amount", and "simple & sales amount" are generated by the expansion unit 12 from the second sample (step S1601). The three feature combinations thus generated in step S1601, that is, "simple", "sales amount", and "simple & sales amount", are compared with the model (step S1602). In this step, a feature combination in the model corresponding to the hatching in FIG. 16 is matched with one of the feature combinations generated from the second sample in step S1601. To put it specifically, the feature combination "simple" in the learning data is matched with the feature combination "simple" in the model. In this case, except for the feature combination "simple", the learning data includes no feature combination which is matched with any one of the feature combinations in the model. The spam score total is set at "−1". The label of the second sample represents a positive type. Since the "minus" sign of the span score total is different from the "plus" sign of the label of the second sample, it is determined that the second sample is classified into a wrong class.

In this case, in the first round, the second sample is classified into the wrong class as well. Thus, the determination unit 21 increments the error count of the second sample by one. Thereafter, the error count $E[x_i]$ is compared with the maximum feature size L (step S1603). Since the obtained determination result is the error count "1"<the maximum feature size "2", the update feature size I is set at a value of the error count "1". Based on the update feature size I at "1", feature combinations "simple" and "sales amount" are generated from the second sample, as the feature combinations to be used for the model update for the second sample in the first round.

Thus, as discussed below, the model is updated (step S1604). To put it specifically, the spam score "+1" assigned to the "positive type" label of the second sample is added to the current spam scores respectively associated with feature combinations included in the model and matched with the feature combinations "simple" and "sales amount" generated based on the update feature size I at "1". In other words, the spam score "+1" is added to the feature combination "simple" in the model. Thus, the spam score associated with the feature combination "simple" becomes equal to "0" (zero). In addition, out of the feature combinations "simple" and "sales amount" generated based on the update feature size I at "1", a feature combination unmatched with any one of the feature combinations included in the model is added to the model. To put it specifically, out of the three feature combinations extracted in step S1601, "sales amount" is added to the model storage unit 13. At this time, the spam score "+1" assigned to the "positive type" label of the second sample in the learning data T is associated with the feature combination "sales amount". A model 13e3 is obtained through the comparison and update in the first round.

Thereafter, in the second round, as illustrated in FIG. 17, three feature combinations "simple", "speed", and "simple & speed" are generated by the expansion unit 12 from the first sample (step S1701). The three feature combinations thus generated in step S1701, that is, "simple", "speed", and "simple & speed", are compared with the model (step S1702). In this second round, the feature combinations "simple" and "speed" in the model 13e3 corresponding to the hatching in FIG. 17 are matched with the feature combinations "simple" and "speed" generated from the first sample in step S1701. In this case, the spam score total becomes equal to "−1 (=0−1)". The label of the first sample represents a negative type. Since the "minus" sign of the spam score total coincides with the "minus" sign of the label of the first sample, it is determined that the first sample is classified into a correct class. Thus, the model 13e3 stored in the model storage unit 13 is not updated.

In the second round, subsequently, as illustrated in FIG. 18, three feature combinations "simple", "sales amount", and "simple & sales amount" are generated as expanded features by the expansion unit 12 from the second sample (step S1801). The three feature combinations thus generated in step S1801, that is, "simple", "sales amount", and "simple & sales amount", are compared with the model (step S1802). In this second round, the feature combinations "simple" and "sales amount" in the model 13*e*3 corresponding to the hatching illustrated in FIG. 18 are matched with the feature combinations "simple" and "sales amount" generated from the second sample in step S1801. In this case, the spam score total becomes equal to "+1 (=0+1)". The label of the second sample represents a positive type. Since the "plus" sign of the spam score total coincides with the "plus" sign of the label of the second sample, it is determined that the second sample is classified into a correct class. Thus, also for the second sample, the model 13*e*3 stored in the model storage unit 13 is not updated.

The comparison using the model 13*e*3 makes it possible to derive the results of classifying the first and second samples which are consistent with their labels.

[Model Size Comparison]

As discussed above, in the Embodiment 1, the model update is performed based on the maximum feature size. For this reason, in step S1103, the feature combination "simple & speed" generated with the feature size at "2" is added to the model; and in step S1203, the feature combination "simple & sales amount" generated with the feature size at "2" is added to the model, and eventually the model 13*e*2 is obtained. Meanwhile, in the Embodiment 2, the model update is performed based on the update feature size corresponding to the error count unless the error count reaches the maximum feature size. For this reason, the comparison between the error count and the maximum feature size provides the determination that the feature combinations "simple & speed" and "simple & sales amount" do not have to be added to the model, and the model 13*e*3 is learned without adding any of the feature combinations "simple & speed" and "simple & sales amount" to the mode. This makes it possible for the model 13*e*3 to exclude the feature combinations "simple & speed" and "simple & sales amount" from the model while maintaining the learning precision at the same level as the model 13*e*2. Accordingly, the model update in the Embodiment 2 is capable of reducing the model size than the model update in the Embodiment 1.

Figure 19A:
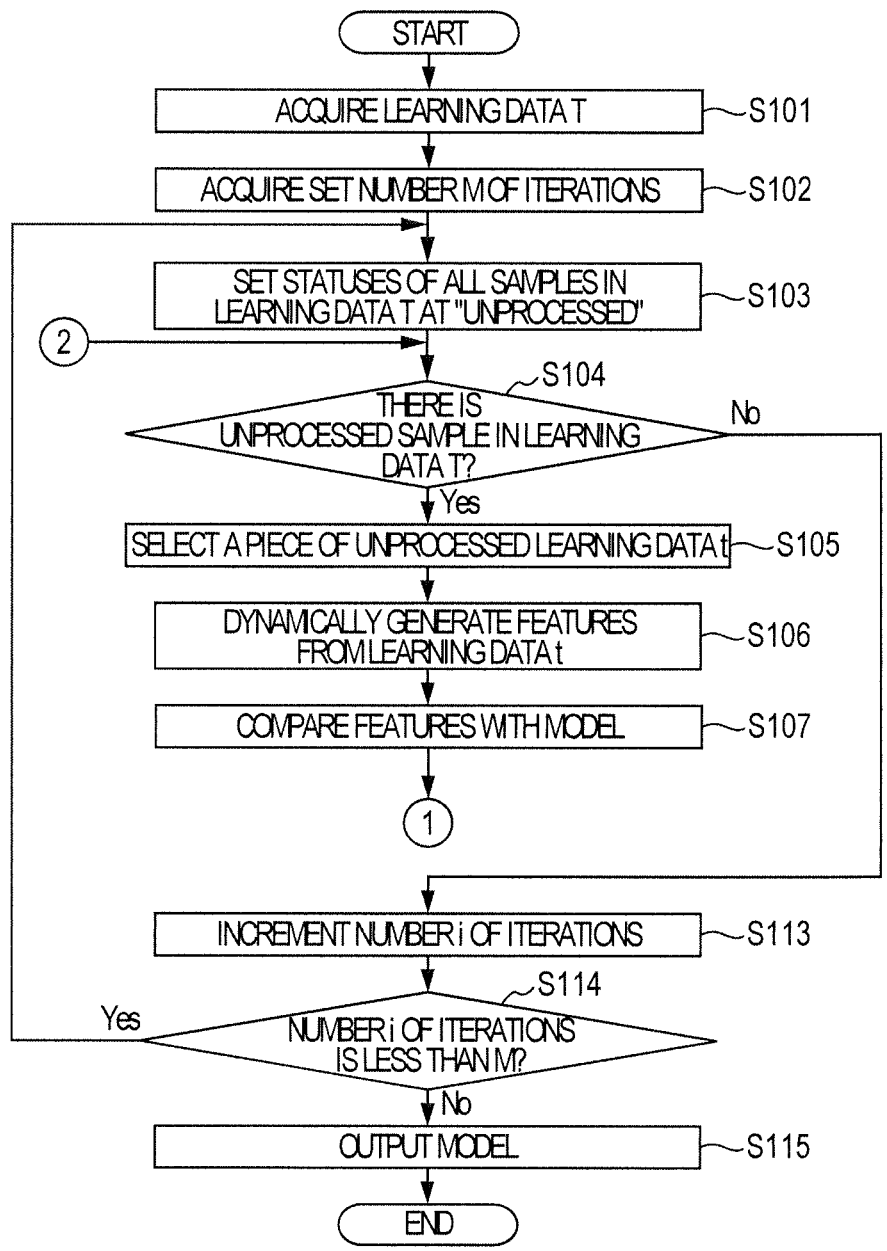
FIGS. 19A and 19B are diagrams illustrating an example of an operational flowchart for learning processing, according to an embodiment.
Figure 19B:
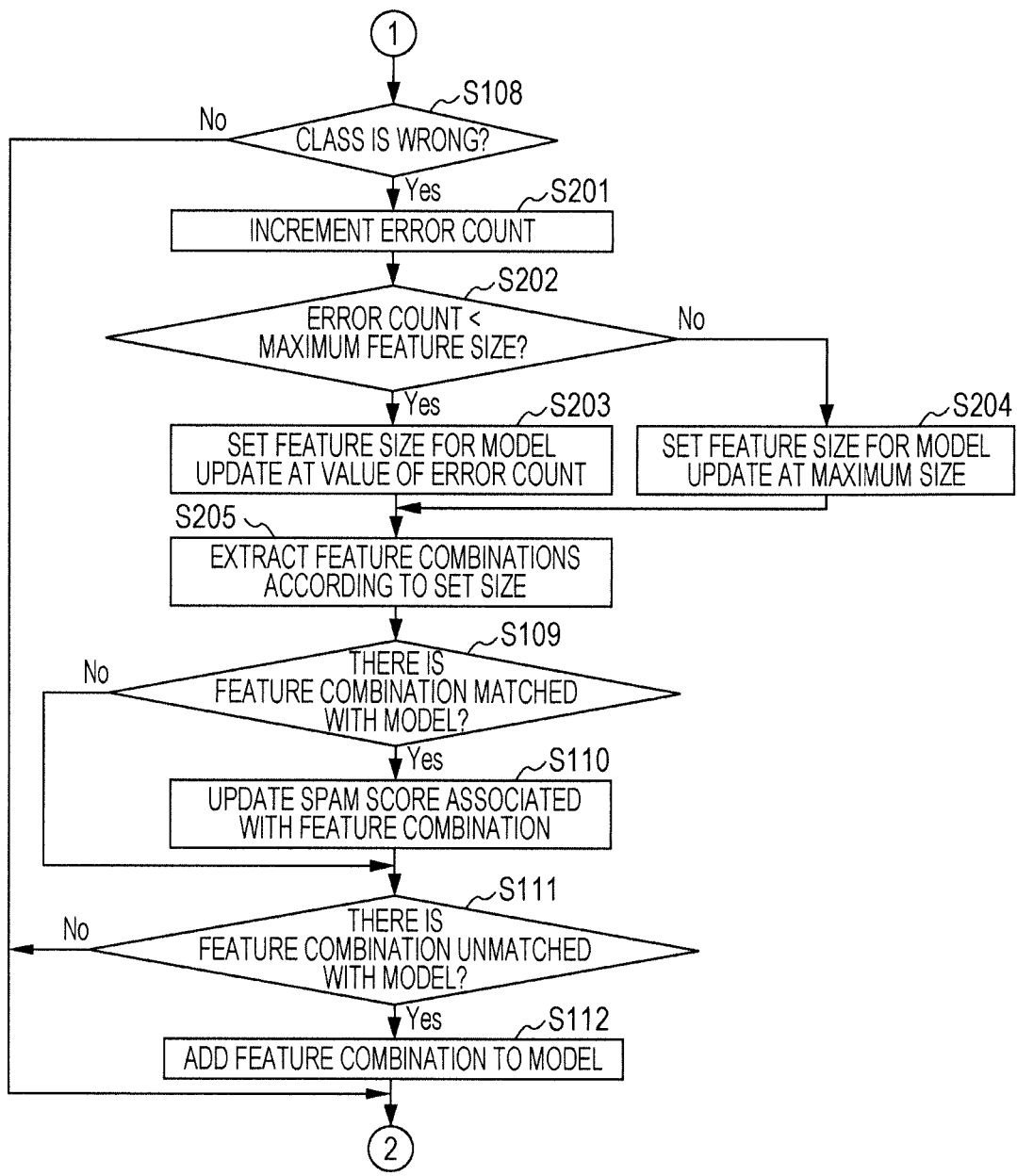

FIGS. 19A and 19B are flowcharts illustrating a procedure for the learning processing in the Embodiment 2. This learning processing is able to be activated when the learning processing is directed by the inputting of the direction using the input unit or the like, or automatically activated when learning data is acquired, in a manner similar to the learning processing illustrated in FIG. 8.

The learning processing illustrated in FIGS. 19A and 19B are different from the learning processing in FIG. 8 in that processes in steps S201 to S205 which are performed when step S108 makes a Yes determination are added to the steps included in the learning processing in FIG. 8. Incidentally, in FIGS. 19A and 19B, the steps of performing the same processes as the steps illustrated in FIG. 8 are denoted by the same step numbers.

As illustrated in FIG. 19A, the acquisition unit 11 acquires the learning data T, and the set number M of iterations of the learning (steps S101 and S102). Depending on precision desired by the model, the number M of iterations may be set at an arbitrarily-selected value in advance. Incidentally, it does not matter which of the processes in steps S101 and S102 is performed earlier. The processes in steps S101 and S102 may be performed in parallel.

Subsequently, the acquisition unit 11 sets the statuses of all the samples in the learning data T acquired in step S101, for examples, their flags or the like, at "unprocessed" (step S103). As long as there is an unprocessed learning data sample left in the learning data T (Yes in step S104), the processes in step S105 and the ensuing steps are performed.

To put it specifically, the expansion unit 12 selects one piece of unprocessed learning data t from the learning data T acquired in step S101 (step S105). Subsequently, using a specified algorithm, the expansion unit 12 dynamically generates feature combinations from the piece of learning data t selected in step S105 (step S106). For example, the generation of combinations of up to two words is achieved by extracting all the words and generating all the two-word combinations from the piece of learning data t. Subsequently, the comparison unit 14 compares the feature combinations generated by the expansion unit 12 from the piece of learning data t with the feature combinations included in the model stored in the model storage unit 13 (step S107).

When the result of the comparison in step S107 is inconsistent with the label, that is, when the sign of the cumulative spam score value is different from the sign of the label, or when the cumulative spam score value becomes equal to 0 (zero) (Yes in step S108), the determination unit 21 performs the following processing. The determination unit 21 updates an error count included in the error data stored in the internal memory and associated with the misclassified learning data sample, for example, by incrementing the error count (step S201).

Thereafter, the determination unit 21 determines whether the error count updated in step S201 is less than the maximum feature size, that is, whether the error count<the maximum feature size L (step S202).

When the error count<the maximum feature size L (Yes in step S202), the determination unit 21 sets the update feature size I at the value of the error count (step S203). On the other hand, when the error count≥the maximum feature size L (No in step S202), the determination unit 21 sets the update feature size I at the value of the maximum feature size L (step in S204). According to the update feature size I set in step S203 or in step S204, the determination unit 21 generates feature combinations from the learning data sample (step S205).

Thereafter, the update unit 15 determines whether there is a feature combination matched with the feature combinations generated in the step S205, in the model (step S109). Incidentally, when the piece of learning data t is not classified into the wrong class (No in step S108), the model is not updated and the process step proceeds to step S104.

When there are feature combinations matched with the feature combinations extracted in step S205 in the model (Yes in step S109), the update unit 15 updates the model by adding the spam score assigned to the label of the piece of learning data t to the current spam scores respectively associated with the feature combinations included in the model and matched with the feature combinations generated from the piece of learning data t in the step S205 (step S110). Incidentally, when No in step S109, the process in step S110 is skipped.

Furthermore, when there is a feature combination generated in the step S205 that is unmatched with the feature combinations included in the model (Yes in step S111), the update unit 15 adds the feature combination unmatched with any of the feature combinations included in the model, to the model in the model storage unit 13 (step S112). At this time, the confidence value associated with the feature combination to be added to the model is set depending on the label of the piece of learning data t. Incidentally, when No in step S111, the process in step S112 is skipped. Thereafter, the process step proceeds to step S104.

Subsequently, when there are no unprocessed samples included in the learning data T (No in step S104), the number i of iterations of the trial retained in the register or the like, albeit not illustrated, is incremented (step S113).

Thereafter, when the number i of iterations of the trial is less than the number M of iterations acquired in step S102 (Yes in step S114), the process step proceeds to step S103 discussed above, and the processes from S103 through step S113 are performed repeatedly.

Meanwhile, when the number i of iterations of the trial reaches the number M of iterations acquired in step S102 (No in step S114), the update unit 15 outputs the model stored in the model storage unit 13 to a predetermined output destination (step S115), and the learning processing is terminated. Incidentally, examples of the output destination of the model include an application program for performing a mail filtering process. Further, in a case where the generation of a model is requested from an external device, the generate model may be returned to the externa device which originates the request.

[Aspect of Effect]

As discussed above, in the case where the result of comparing the labeled learning sample with the model is inconsistent with the label, the learning machine 20 of the Embodiment 2 updates the model by changing the feature size to be used for the model update depending on the error count of the learning sample. Accordingly, the learning machine 20 of the Embodiment 2 is capable of reducing the model size.

Embodiment 3

Although the foregoing descriptions have been provided for the embodiments of the disclosed learning machine, the technical idea disclosed therein may be carried out in various modes different from the above-discussed embodiments. The following descriptions are provided for another embodiment which is included in the technical idea disclosed therein.

[Application to Sub-Structural Data]

The foregoing Embodiment 1 discusses how to efficiently use the perceptron for the feature combination learning. The above-discussed learning processing is also applicable to the learning of sub-structural data such as strings, trees, and graphs, and to AROW modified from the Confidence-Weighted learning. FIG. 20 is a diagram illustrating an example of a pseudo algorithm for AROW based on dynamic feature expansion. "x" illustrated in FIG. 20 represents a word string; and $\varphi(x)$ represents a function for mapping a combination of features included in the word string x, or a partial character string extracted from the word string x, for example a partial character string common between two piece of structural data, to a vector. Furthermore, in FIG. 20, "$\mu$" represents a weight vector. For example, in a d-dimensional vector space, "$\mu_t$" represents a d-dimensional weight vector in a t-th round. Furthermore, in FIG. 20, "$\Sigma$" represents the confidence value of a feature. For example, "$\Sigma_t$" represents a d×d matrix that holds the confidence value of a feature in the t-th round. In this case, the learning machine 10 explicitly converts an inputted word string X into a vector by using the function $\varphi(x)$, and updates $\Sigma_t$ that holds the confidence value of the feature, at the same time, when updating the weight vector $\mu_t$.

In other words, in a manner similar to the existing method, the learning machine 10 performs the classification and the feature expansion only on partial structures which are matched with partial structures in the model $\mu_t$, and thereby reduces the processing time. Furthermore, the learning machine 10 employs a method of continuing to list partial structures only when a partial structure is matched with the model.

Figure 21:
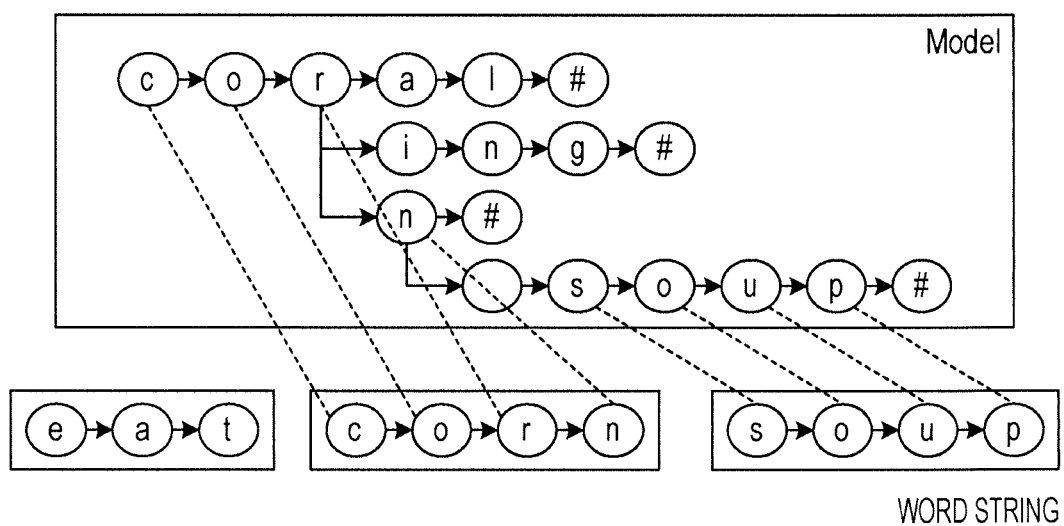
FIG. 21 is a diagram illustrating an example of how comparison is performed using partial structures in a model, according to an embodiment.

To put it specifically, to perform the updating, the learning machine 10 generates a string containing words whose size is up to a designated size. FIG. 21 is a diagram illustrating an example of how the comparison is performed using partial structures which are stored in a model described in the form of a trie structure. FIG. 21 illustrates how a combination of "corn" and "soup" drawn from three given words "eat", "corn", and "soup" is compared with a model in which "coral", "coring", "corn", and "corn soup" (a string of words in succession) are registered in the trie structure. As illustrated in FIG. 21, first of all, "corn" matched with the beginning word of the trie structure is found; thereafter, "soup" matched with the word coming after the combination delimiter in the trie structure, denoted by a white circle in FIG. 21, is found; and the terminal symbol "#". As discussed above, the learning machine 10 performs the method in which: a model is held in the form of a trie structure; and when the model includes a feature combination matched with a feature combination generated from inputted learning data, the remaining feature combinations and features generated from the learning data are compared with the model without interruption. Thereby, the learning machine 10 generates expansion features including only combinations partially matched with those in the model, instead of generating all the combinations as expansion features.

In addition, the registration starts with temporary expansion of all the combinations. For example, the incorporation into the model of combinations of up to two words in succession drawn from three words "corn", "eat", and "soup" is achieved by: generating expansion features of "eat", "corn", "soup", "eat corn", and "corn soup"; and, in a manner similar to the conventional AROW, computing the weights of the respective expansion features for the classification and the confidence values of the respective expansion features for the update, and registering the expansion features, as well as the computed weights and confidence values, in the model described in the form of the trie structure. This makes it possible to learn the feature combinations without generating expansion futures including all the feature combinations from all the examples.

The above-discussed learning processing is also applicable to the learning machine 20 of Embodiment 2, the learning of sub-structural data such as strings, trees, and graphs, as well as AROW modified from the Confidence-Weighted learning. FIG. 22 is a diagram illustrating an example of a pseudo algorithm for error-based AROW. What are represented by "x", "$\varphi(x)$", "$\mu$" and "$\Sigma$" illustrated in FIG. 22 is the same as what are represented by those illustrated in FIG. 20. The differential between the algorithm illustrated in FIG. 22 and that illustrated in FIG. 20 is the same as the differential between the algorithm illustrated in FIG. 2 and that illustrated in FIG. 10. To put it specifically, the application of the algorism illustrated in FIG. 22 to the learning machine 20 is different from the operation of the learning machine 10 using the algorithm illustrated in FIG. 20 in that when a learning data sample $x_t$ is classified into a wrong class, the update feature size I to be used for the current model update is set at a minimum value between the maximum feature size L and the error count $E[x_t]$.

[Error Count]

Although the foregoing Embodiment 2 discusses the case where the update feature size I is set at a minimum value between the maximum feature size L and the error count $E[x_t]$, the error count may not be directly compared with the maximum feature size L. For example, the update feature size I may be set at a minimum value between the maximum feature size L and $E[x_t]/N$ obtained by dividing the error count $E[x_t]$ by a constant N. When $E[x_t]/N$ is not an integer, $E[x_t]/N$ may be converted into an integer, for example, by rounding off $E[x_t]/N$ to the nearest whole number. This conversion makes it possible to perform the processing in the same way as the Embodiment 2. In this case, as the constant N is set at a larger value, the model size becomes smaller.

[Application to Sequential Labeling]

The foregoing learning processing is also applicable to sequential labeling as well. To put it specifically, in CRF learning based on stochastic gradient decent or in structured perceptron, the learning is feasible while dynamically expanding features as in the case of feature vectors.

[Application to Other Sub-Structural Data]

The foregoing learning processing is also applicable to other sub-structural data, such as strings and trees, which have not been discussed above. To put it specifically, in a case where the foregoing learning processing is applied to a method disclosed in a document written by Mohammed Zaki listed above, a feature vector is generated in which a feature is a partial tree whose size is up to the specified size, and the update is performed using the thus-generated feature vectors. In this respect, the "specified size" means the number of nodes included in the partial tree. Since a string is a tree that has only one child, strings and trees may be similarly treated as data. Furthermore, as disclosed in Mohammed Zaki, the tree structure may be described in the form of a character string. For this reason, in a case where the tree structure is managed using the trie structure in the same way as the above-discussed vectors, it is possible to perform the processing through dynamic expansion when there is a partial match.

In addition, in a case where the foregoing learning processing is applied to a method disclosed in a document written by X. Yan and J. Han listed above, the elements in a model are stored as the depth-first search (DFS) code, the matching may be performed such that when there is a partial match with the DFS code, the expansion is performed in order to check the next. Furthermore, the model update is performed by: listing partial graphs whose size is up to a specified size while avoiding overlaps between the partial graphs; and generating a feature vector in which each partial graph is defined as a feature. In this respect, the "specified size" means the number of included nodes, or the number of edges.

[Distribution and Integration]

Meanwhile, each illustrated machine may not physically include all the components as illustrated. In other words, the specific mode of the distribution and integration of the components in each machine is not limited to the illustrated one. For example, depending on various loads and use conditions, each machine may include all or some of the components as an arbitrary unit group by functional and physical distribution and integration. For example, the acquisition unit 11, the expansion unit 12, the comparison unit 14, or the update unit 15 may be provided as an external unit of the learning machine 10, and coupled to the learning machine 10 through a network. Otherwise, the acquisition unit 11, the expansion unit 12, the comparison unit 14, and the update unit 15 may be provided to the respective apparatuses coupled to a network such that the function of the learning machine 10 is achieved by collaboration among the units.

[Learning Programs]

Each processing discussed in the foregoing embodiments is achievable by causing a computer such as a personal computer or a workstation to execute a program prepared in advance. From this viewpoint, an example of a computer for executing learning programs including the same functions as discussed in the foregoing embodiments is hereinbelow explained using FIG. 23.

Figure 23:
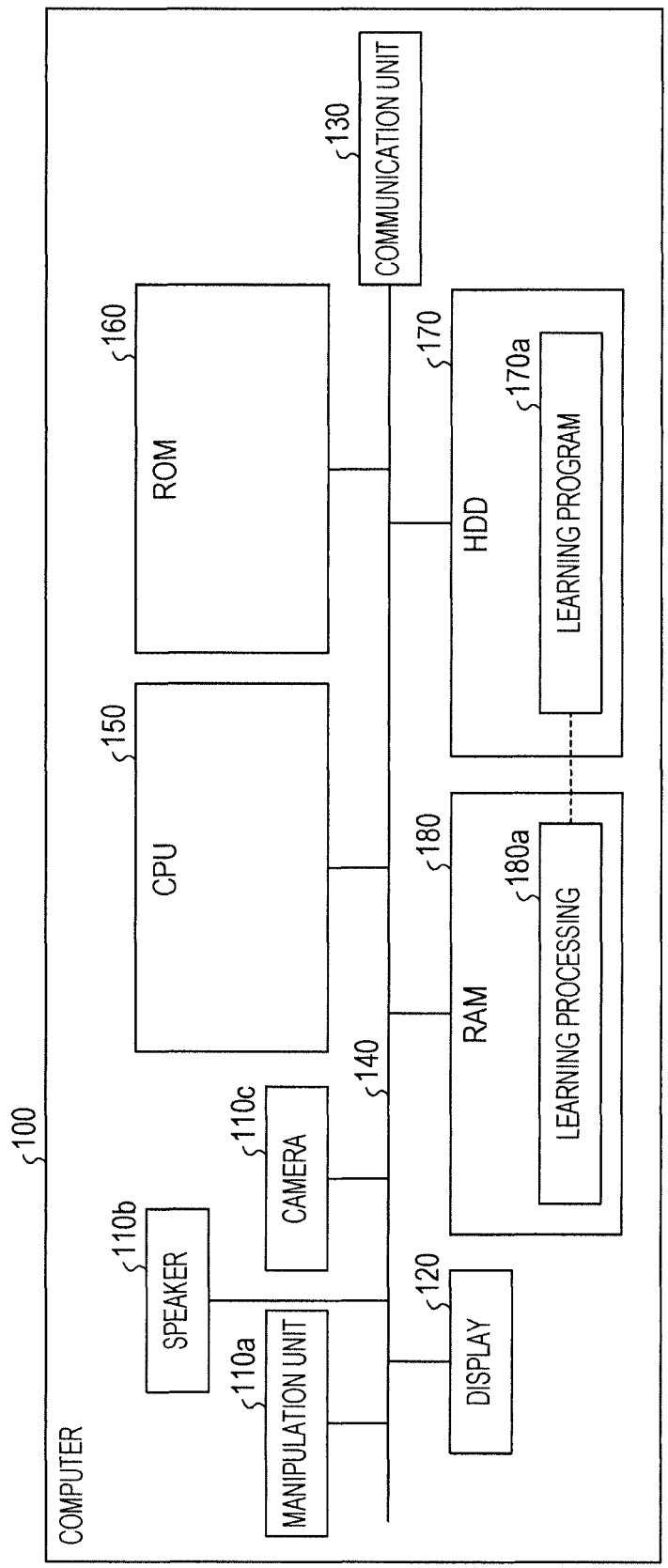
FIG. 23 is a diagram illustrating an example of a hardware configuration of a computer configured to execute learning programs, according to an embodiment.

FIG. 23 is a diagram illustrating an example of a hardware configuration of the computer for executing the learning programs according to Embodiments 1 to 3. As illustrated in FIG. 23, the computer 100 includes a manipulation unit 110a, a speaker 110b, a camera 110c, a display 120 and a communication unit 130. The computer 100 further includes a CPU 150, a ROM 160, a HDD 170, and a RAM 180. These components 110 to 180 are coupled together through a bus 140.

As illustrated in FIG. 23, the HDD 170 may store a learning program 170a configured to exert the same functions as the acquisition unit 11, the expansion unit 12, the comparison unit 14, and the update unit 15 illustrated for the foregoing Embodiment 1. Further, the HDD 170 may store a learning program 170a configured to exert the same functions as the acquisition unit 11, the expansion unit 12, the comparison unit 14, the update unit 15, and the determination unit 21 illustrated for the foregoing Embodiment 2. The program 170a may be distributed or integrated in the same way as the acquisition unit 11, the expansion unit 12, the comparison unit 14, and the update unit 15 illustrated in FIG. 1. The program 170a may be distributed or integrated in the same way as the acquisition unit 11, the expansion unit 12, the comparison unit 14, the update unit 15, and the determination unit 21 illustrated in FIG. 9. In other words, the HDD 170 may not store all the data demonstrated for the foregoing Embodiment 1, and the HDD 170 may not store all the data demonstrated for the foregoing Embodiment 2. Storing data to be used for the processing in the HDD 170 suffices.

In this environment, the CPU 150 reads the learning program 170a from the HDD 170, and expands the learning program 170a onto the RAM 180. Thus, the learning program 170a functions as a learning process 180a, as illustrated in FIG. 23. The learning process 180a expands the various data read from the HDD 170 onto a region assigned to the learning process 180a which is a part of a memory area in the RAM 180, and performs various processing by using the various data thus expanded. Examples of the processing performed by the learning process 180a include the processing illustrated in FIGS. 8, 19A, and 19B. Incidentally, all the processing units illustrated for the foregoing Embodiment 1 may not operate in the CPU 150. Virtually implementing processing units corresponding to the processes to be performed suffices.

It is noted that the learning program 170a may not be stored in the HDD 170 or the ROM 160 from the beginning. For example, the learning program 170a may be stored in a flexible disk insertable into the computer 100, that is to say, a "portable physical medium" such as a FD, a CD-ROM, a DVD disk, a magneto-optical disk and an IC card such that the computer 100 acquires the learning program 170a from the "portable physical medium and executes the learning program 170a. Further, the learning program 170a may be stored in another computer or a server apparatus coupled to the computer 100 via the Internet, LAN and WAN such that the computer 100 acquires the learning program 170a from it and executes the learning program 170a.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process comprising:
   acquiring learning data to which a label of positive type or negative type is assigned, the learning data including feature-elements each configured as a feature or sub-structural data;
   generating a first set of expanded feature-elements by expanding the feature-elements included in the acquired learning data so that each expanded feature-element is configured as data generated from a combination of one or more feature-elements;
   with reference to a model in which a confidence value indicating a degree of confidence for a feature-element is stored in association with each of a second set of expanded feature-elements, comparing each of the first set of expanded feature-elements with the second set of expanded feature-elements stored in the model, and updating first confidence values associated with expanded feature-elements that are common between the first set of expanded feature-elements and the second set of expanded feature-elements stored in the model, based on a type of label assigned to the learning data; and
   upon occurrence of a classification error indicating that a type of a score calculated from the updated first confidence values is inconsistent with a type of the label assigned to the acquired learning data, setting a feature size indicating a maximum size of expanded feature-elements to be used to update the model, based on an error count indicating a number of occurrences of the classification error for the acquired learning data, and updating the model by adding, out of expanded feature-elements generated according to the set feature size, expanded feature-elements unmatched with the second set of expanded feature-elements stored in the model, to the model.

2. The non-transitory computer-readable recording medium of claim 1, the process further comprising:
   upon occurrence of the classification error occurs, updating the first confidence values, based on a type of the label assigned to the acquired learning data.

3. The non-transitory computer-readable recording medium of claim 1, wherein the sub-structural data is data that is represented by any one of an array structure, a tree structure, and a graph structure.

4. The non-transitory computer-readable recording medium of claim 3, wherein the learning data is configured as text data, and the sub-structural data is configured as partial character strings each common to plural pieces of the text data.

5. A method comprising:
   acquiring learning data to which a label of positive type or negative type is assigned, the learning data including feature-elements each configured as a feature or sub-structural data;
   generating a first set of expanded feature-elements by expanding the feature-elements included in the acquired learning data so that each expanded feature-element is configured as data generated from a combination of one or more feature-elements;
   with reference to a model in which a confidence value indicating a degree of confidence for a feature-element is stored in association with each of a second set of expanded feature-elements, comparing each of the first set of expanded feature-elements with the second set of expanded feature-elements stored in the model, and updating first confidence values associated with expanded feature-elements that are common between the first set of expanded feature-elements and the second set of expanded feature-elements stored in the model, based on a type of label assigned to the learning data; and
   upon occurrence of a classification error indicating that a type of a score calculated from the updated first confidence values is inconsistent with a type of the label assigned to the acquired learning data, setting a feature size indicating a maximum size of expanded feature-elements to be used to update the model, based on an error count indicating a number of occurrences of the classification error for the acquired learning data, and updating the model by adding, out of expanded feature-elements generated according to the set feature size, expanded feature-elements unmatched with the second set of expanded feature-elements stored in the model, to the model.

6. An apparatus comprising:
   a memory; and
   a processor coupled to the memory and configured to:
   acquire learning data to which a label of positive type or negative type is assigned, the learning data including feature-elements each configured as a feature or sub-structural data;
   generate a first set of expanded feature-elements by expanding the feature-elements included in the acquired learning data so that each expanded feature-element is configured as data generated from a combination of one or more feature-elements;
   with reference to a model in which a confidence value indicating a degree of confidence for a feature element is stored in association with each of a second set of expanded feature-elements, compare each of the first set of expanded feature-elements with the second set of expanded feature-elements stored in the model, and update first confidence values associated with expanded feature-elements that are common between the first set of expanded feature-elements and the second set of expanded feature-elements stored in the model, based on a type of label assigned to the learning data; and
   upon occurrence of a classification error indicating that a type of a score calculated from the updated first confidence values is inconsistent with a type of the label assigned to the acquired learning data, set a feature size indicating a maximum size of expanded feature-elements to be used to update the model, based on an error count indicating a number of occurrences of the classification error for the acquired learning data, and update the model by adding, out of expanded feature-elements generated according to the set feature size, expanded feature-elements unmatched with the second set of expanded feature-elements stored in the model, to the model.

* * * * *